US012573964B2

(12) United States Patent
Mukherjee et al.

(10) Patent No.: US 12,573,964 B2
(45) Date of Patent: Mar. 10, 2026

(54) FLYING CAPACITOR MULTI-LEVEL RECTIFIER AND CONTROL METHOD THEREOF

(71) Applicant: Delta Electronics, Inc., Taipei (TW)

(72) Inventors: Satyaki Mukherjee, Durham, NC (US); Chi Zhang, Durham, NC (US); Peter Mantovanelli Barbosa, Durham, NC (US)

(73) Assignee: Delta Electronics, Inc., Taipei (TW)

( * ) Notice: Subject to any disclaimer, the term of this patent is extended or adjusted under 35 U.S.C. 154(b) by 440 days.

(21) Appl. No.: 17/983,156

(22) Filed: Nov. 8, 2022

(65) Prior Publication Data

US 2024/0162831 A1 May 16, 2024

(51) Int. Cl.
*H02M 3/158* (2006.01)
*H02M 1/00* (2006.01)
*H02M 7/219* (2006.01)

(52) U.S. Cl.
CPC ......... *H02M 7/219* (2013.01); *H02M 1/0058* (2021.05); *H02M 1/0095* (2021.05)

(58) Field of Classification Search
CPC .............................. H02M 3/07; H02M 1/0095
See application file for complete search history.

(56) References Cited

U.S. PATENT DOCUMENTS 6,349,044 B1   2/2002   Canales-Abarca et al.
9,246,407 B2   1/2016   Schroeder et al.
9,571,006 B2   2/2017   Stahl et al.
9,871,467 B2   1/2018   Liang et al.
(Continued)

FOREIGN PATENT DOCUMENTS

CN   104779824 A   7/2015
CN   112910281 A   6/2021
(Continued)

OTHER PUBLICATIONS

C. Zhang et al. "DC-link Capacitor Voltage Balancing Control for Series Half Bridge LLC Resonant Converter" 2020 IEEE Applied Power Electronics Conference and Exposition (APEC), 2020, pp. 2163-2169. (Year: 2020).*

(Continued)

*Primary Examiner* — Monica Lewis
(74) *Attorney, Agent, or Firm* — KIRTON McCONKIE; Evan R. Witt

(57) ABSTRACT

FCML rectifiers and control methods thereof are provided. The FCML rectifier operates with an input voltage and includes an inductor, a plurality of upper switches, and a plurality of lower switches. The upper and lower switches are electrically connected in series. The inductor is coupled between the input voltage and a midpoint between the upper switches and the lower switches. During critical transition points, at least one of first and second modulation schemes is performed. In the first modulation scheme, any rising edge of the control signal of any one lower switch is controlled to be synchronous with a rising edge of the control signal of at least one another lower switch for achieving ZVS. In the second modulation scheme, a phase-shift of the control signals and a switching frequency are controlled to achieve ZVS with minimum conduction loss.

19 Claims, 36 Drawing Sheets

(56) References Cited

U.S. PATENT DOCUMENTS

| | | | |
|---|---|---|---|
| 9,923,484 B2 | 3/2018 | Vahedi et al. | |
| 10,536,073 B2 | 1/2020 | Young et al. | |
| 2014/0346962 A1 | 11/2014 | Sanders et al. | |
| 2015/0171763 A1* | 6/2015 | Kondo | H02M 1/4225 |
| | | | 363/37 |
| 2017/0237339 A1 | 8/2017 | Young et al. | |
| 2018/0131271 A1 | 5/2018 | Ying et al. | |
| 2023/0336075 A1* | 10/2023 | Liu et al. | H02M 3/07 |

FOREIGN PATENT DOCUMENTS

| | | | | |
|---|---|---|---|---|
| EP | 3896835 A1 * | 10/2021 | | H02M 1/0009 |
| EP | 3537585 B1 | 1/2022 | | |
| JP | 2013118776 A | 6/2013 | | |
| TW | I261408 B | 9/2006 | | |
| TW | 201703418 A | 1/2017 | | |
| WO | 2019029694 A1 | 2/2019 | | |
| WO | 2020121469 A1 | 6/2020 | | |

OTHER PUBLICATIONS

Z. Liu et al., "Design of GaN-Based MHz Totem-Pole PFC Rectifier" IEEE Journal of Emerging and Selected Topics in Power Electronics, vol. 4, No. 3, pp. 799-807, Sep. 2016.

T. A. Meynard et al., "Multi-level conversion: high voltage choppers and voltage-source inverters" PESC '92 Record. 23rd Annual IEEE Power Electronics Specialists Conference, 1992, pp. 397-403 vol. 1.

Q. Huang et al., "99% Efficient 2.5-kW Four-Level Flying Capacitor Multilevel GaN Totem-Pole PFC" IEEE Journal of Emerging and Selected Topics in Power Electronics, vol. 9, No. 5, pp. 5795-5806, Oct. 2021.

M. E. Blackwell et al., "Dynamic Level Selection for Full Range ZVS in Flying Capacitor Multi-Level Converters" 2018 IEEE 19th Workshop on Control and Modeling for Power Electronics (COMPEL), 2018, pp. 1-8.

C. Zhang et al., "DC-link Capacitor Voltage Balancing Control for Series Half Bridge LLC Resonant Converter" 2020 IEEE Applied Power Electronics Conference and Exposition (APEC), 2020, pp. 2163-2169.

* cited by examiner

Proposed Modulation 1 – switching frequency 3f$_o$

Proposed Modulation 2 – switching frequency 2f$_o$

Proposed Modulation 1 – switching frequency $3f_0$

Proposed Modulation 2 – switching frequency $2f_0$

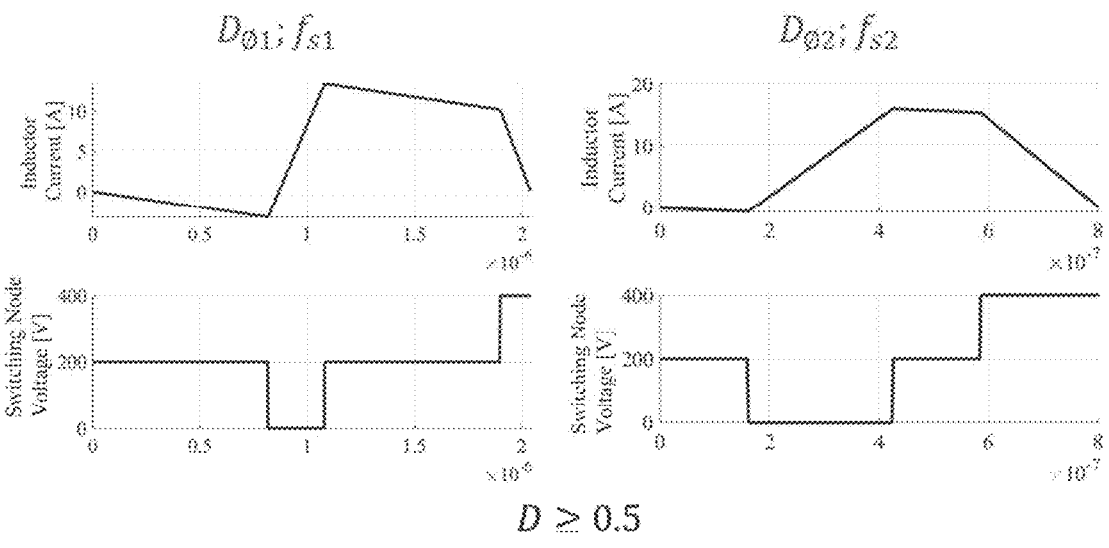
$$D \geq 0.5$$
FIG. 15A                    FIG. 15B
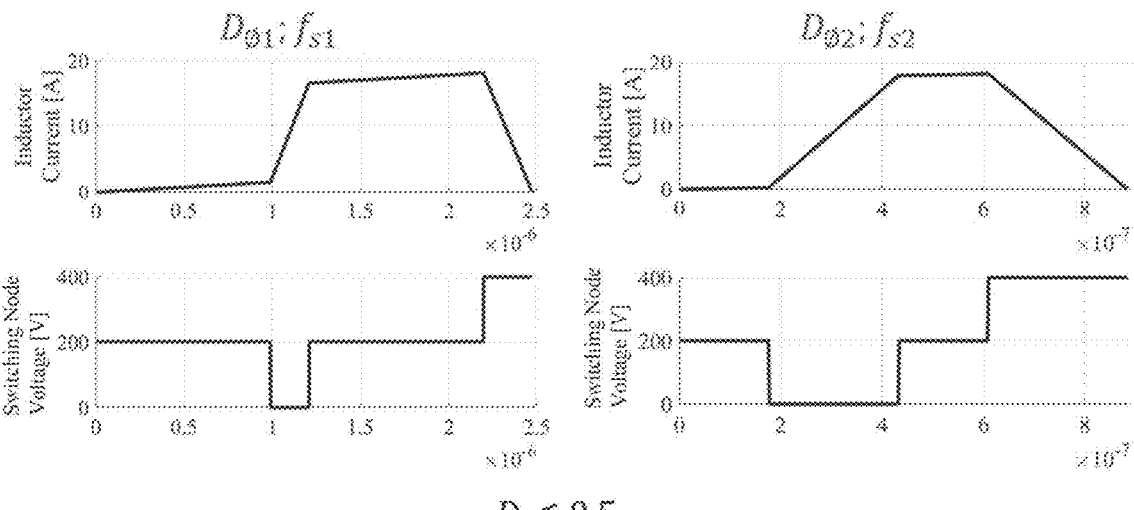
$$D \leq 0.5$$
FIG. 15C                    FIG. 15D

FLYING CAPACITOR MULTI-LEVEL RECTIFIER AND CONTROL METHOD THEREOF

FIELD OF THE INVENTION

The present disclosure relates to a flying capacitor multi-level (FCML) rectifier and a control method thereof, and more particularly to a FCML rectifier and a control method thereof capable of realizing ZVS (zero-voltage switching) of switches over the entire operating range.

BACKGROUND OF THE INVENTION

With recent trends of increasing switching frequency of AC-DC power converters in order to reduce size of the passive components such as the boost inductor and the EMI (electromagnetic interference) filter, the necessity of achieving soft-switching becomes more and more pertinent in present high performance power supplies. See, e.g., the article: (i) "Z. Liu, F. C. Lee, Q. Li and Y. Yang, "Design of GaN-Based MHz Totem-Pole PFC Rectifier," in *IEEE Journal of Emerging and Selected Topics in Power Electronics*".

FIG. 1A shows a conventional PFC (power factor correction) boost rectifier that is operated in triangular or critical conduction mode. FIG. 1B schematically shows the inductor current of the PFC boost rectifier of FIG. 1A under critical conduction mode. FIG. 1C schematically shows operating waveforms of the switching node voltage and the inductor current of the PFC boost rectifier of FIG. 1A for a 50 or 60 Hz line frequency operation. This mode of modulation results in automatic input current-shaping without any active control, while at the same time by the use of valley current switching, zero voltage turn-on of all the semiconductors are guaranteed. Of course, as shown in FIG. 1D, this modulation results in variable switching frequency operation over the line cycle. In FIG. 1A, $v_{in}$ represents an input voltage, $v_{sw}$ represents a switching node voltage $i_L$ represents the inductor current flowing through the inductor, and $V_{bus}$ represents a bus voltage.

A useful way of reducing the device voltage stress and simultaneously increasing effective frequency of the boost inductor is the use of multi-level power conversion circuits. See, e.g., the articles: (i) "T. A. Meynard and H. Foch, "Multi-level conversion: high voltage choppers and voltage-source inverters," *PESC '92 Record. 23rd Annual IEEE Power Electronics Specialists Conference*"; (ii) "Q. Huang, Q. Ma, P. Liu, A. Q. Huang and M. A. de Rooij, "99% Efficient 2.5-kW Four-Level Flying Capacitor Multilevel GaN Totem-Pole PFC," in *IEEE Journal of Emerging and Selected Topics in Power Electronics*". Multi-level circuits allow use of lower voltage rated semiconductor devices, which often have better performance metrics and cost compared to their higher voltage rated counter-parts. These circuits also result in higher effective frequency in the passive components compared to standard two-level circuits, which helps in size reduction of the passive components. However, achieving ZVS in multi-level circuits is not well explored and requires further attention. Of particular interest are the FCML converters, which utilizes relatively smaller size ceramic capacitors to clamp voltages across the semiconductor devices. An example three-level FCML boost converter is shown in FIG. 2A. In FIG. 2A, $v_L$ represents an inductor voltage across the inductor. In this converter, the inner two switches S1 and $\overline{S}_1$ are gated in a complimentary fashion and similarly the outer two switches S2 and $\overline{S}_2$ are gated using time-multiplexed gate signals. As shown by the exemplary gate pulses in FIG. 2B, the rising edge of switch S1 is phase shifted by 180° compared to the rising edge of switch S2, and both rising edges have the same duty cycle governed by the input-to-output voltage relationship of a boost converter, as shown in equation (1):

$$V_{Bus} = \frac{v_{in}}{1-D}, \tag{1}$$

where $V_{Bus}$ is the bus voltage (i.e., the output voltage of the boost converter), $v_{in}$ is the input voltage of the boost converter, and D is the duty cycle.

This phase-shifted modulation scheme results in balanced flying capacitor voltages and reduced dv/dt on the switching nodes as shown in FIG. 2C and is very widely adopted for FCML converters. By using this modulation scheme, the flying capacitor voltage would have a steady-state value of $V_{Bus}/2$, and each device blocking voltage would also be $V_{Bus}/2$. This modulation scheme also results in an effective switching frequency of the inductor which is twice of the device switching frequencies as shown in FIG. 2B.

However, as indicated in: "M. E. Blackwell, A. Stillwell and R. C. N. Pilawa-Podgurski, "Dynamic Level Selection for Full Range ZVS in Flying Capacitor Multi-Level Converters," 2018 *IEEE 19th Workshop on Control and Modeling for Power Electronics (COMPEL)*, 2018", utilizing ZVS becomes challenging in FCML converters with phase-shifted gating signals as the ripple in the inductor current collapses at certain duty cycles of operation as shown in line cycle operation of FIG. 3. It should be noted that the inductor current ripple becomes zero during the operating points where $v_{in}(t)=V_{Bus}/2$. These operating points are highlighted by encircling them in FIG. 3 and are also zoomed for clarity. The root cause of the inductor current ripple collapsing is obvious from the zoomed in switching node voltage waveform. During the line cycle when $v_{in}(t) \cong V_{Bus}/2$ and either increasing or decreasing, the switching node voltage goes from switching between 0, $V_{Bus}/2$ to switching between $V_{Bus}/2$, $V_{Bus}$ or vice verse. As the input voltage is also very close or equal to $V_{Bus}/2$, the inductor current essentially sees very little volt-seconds applied across it. This phenomenon makes achieving ZVS or boundary conduction mode operation for FCML PFCs difficult using standard phase-shifted modulation scheme.

This phenomenon is further demonstrated in FIG. 4 for 3-6 level FCML converters. It is very clearly observed how the normalized inductor current ripple comes down to zero for specific duty cycles in such multi-level converters operating with standard phase-shifted modulation scheme. Generally, the ripple current in the inductor comes down to zero when the input voltage of the boost stage is equal to any one of the flying capacitor voltages in a FCML converter. In a PFC boost converter, since the duty cycle needs to vary all the way from 0 to 1, these operating points with zero effective inductor current ripple arises more and more for higher level FCML boost converters.

Achieving ZVS in a FCML converter without sacrificing its promising features such as reduced voltage stress, low dv/dt for majority of the operating range was addressed in "M. E. Blackwell, A. Stillwell and R. C. N. Pilawa-Podgurski, "Dynamic Level Selection for Full Range ZVS in Flying Capacitor Multi-Level Converters," 2018 *IEEE 19th Workshop on Control and Modeling for Power Electronics (COMPEL)*, 2018". But the specified modulation scheme requires rebalancing of flying capacitor voltages to some other values, which results in some undesirable transients in the converter operation. In a PFC converter, these transients occurring in every line cycle makes the converter operation significantly challenging.

Therefore, there is a need of providing a flying capacitor multi-level rectifier and a control method thereof to obviate the drawbacks encountered from the prior arts.

SUMMARY OF THE INVENTION

It is an objective of the present disclosure to provide a FCML rectifier and a control method thereof capable of realizing ZVS of switches over the entire operating range.

In accordance with an aspect of the present disclosure, there is provided a FCML rectifier configured to operate with an input voltage. The FCML rectifier includes a switching converter stage and a control circuit. The switching converter stage has an input terminal and first and second phase terminals and includes an inductor, N upper switches, N lower switches, N−1 flying capacitors, and an output capacitor, where N is an integer greater than 1. The inductor is coupled to the input voltage and the input terminal. The N upper switches are electrically connected in series between the input terminal and the first phase terminal and operating with the same duty cycle. The first and Nth upper switches are coupled to the input terminal and the first phase terminal respectively. The N lower switches are electrically connected in series between the input terminal and the second phase terminal and operating in complementary to the N upper switches respectively. The first and Nth lower switches are coupled to the input terminal and the second phase terminal respectively. The nth flying capacitor is coupled between a common node between the nth and (n+1)th upper switches and a common node between the nth and (n+1)th lower switches, where n is a positive integer less than N. The output capacitor is electrically connected between the first and second phase terminals. The control circuit is configured to provide control signals to operate the N upper switches and the N lower switches. During critical transition points, the control circuit is adapted to perform at least one of first and second modulation schemes. In the first modulation scheme, the control circuit controls any rising edge of the control signal of any one of the N lower switches to be synchronous with a rising edge of the control signal of at least one another of the N lower switches for achieving ZVS of the switches. In the second modulation scheme, the control circuit controls a phase-shift between the rising edges of the control signals of the N lower switches and a switching frequency of the switches to achieve ZVS of the switches with minimum conduction loss.

In accordance with another aspect of the present disclosure, there is provided a control method of the FCML rectifier of the present disclosure. The control method includes performing at least one of first and second modulation schemes during critical transition points. When the first modulation scheme is performed, any rising edge of a control signal of any one of the N lower switches is controlled to be synchronous with a rising edge of the control signal of at least one another of the N lower switches for achieving ZVS of the switches. When the second modulation scheme is performed, a phase-shift between the rising edges of the control signals of the N lower switches and a switching frequency of the switches are controlled to achieve ZVS of the switches with minimum conduction loss.

BRIEF DESCRIPTION OF THE DRAWINGS

FIG. 15A and FIG. 15B show the same critical transition point achieving boundary conduction mode operation with similar inductor current ripple for two different choice of control variables $D_\Theta$ and $f_s$ for the rectifier under D>0.5;

FIG. 15C and FIG. 15D show the same critical transition point achieving boundary conduction mode operation with similar inductor current ripple for two different choice of control variables $D_\Theta$ and $f_s$ for the rectifier under D<0.5;

DETAILED DESCRIPTION OF THE PREFERRED EMBODIMENT

Figure 1A:
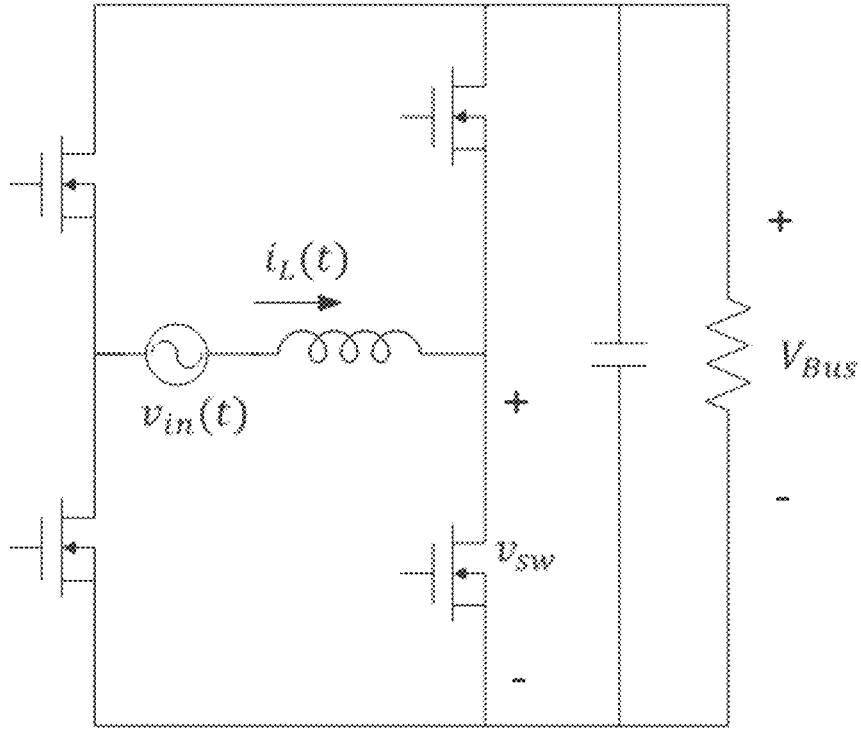
FIG. 1A shows a conventional PFC boost rectifier.
Figure 1B:
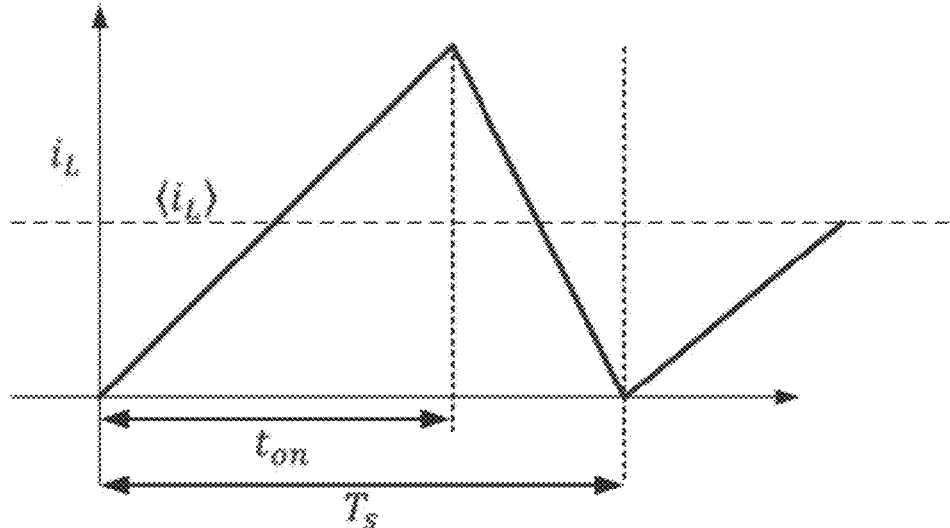
FIG. 1B schematically shows the inductor current of the PFC boost rectifier of FIG. 1A under critical conduction mode.
Figure 1C:
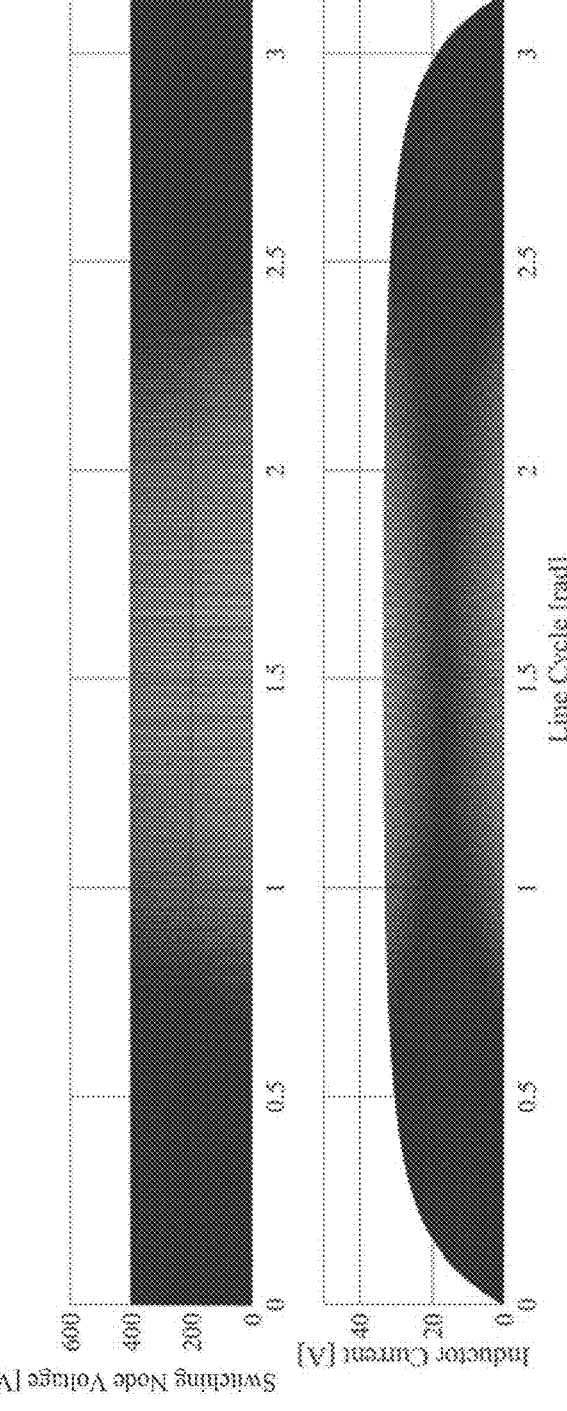
FIG. 1C schematically shows operating waveforms of the switching node voltage and the inductor current of the PFC boost rectifier of FIG. 1A.
Figure 1D:
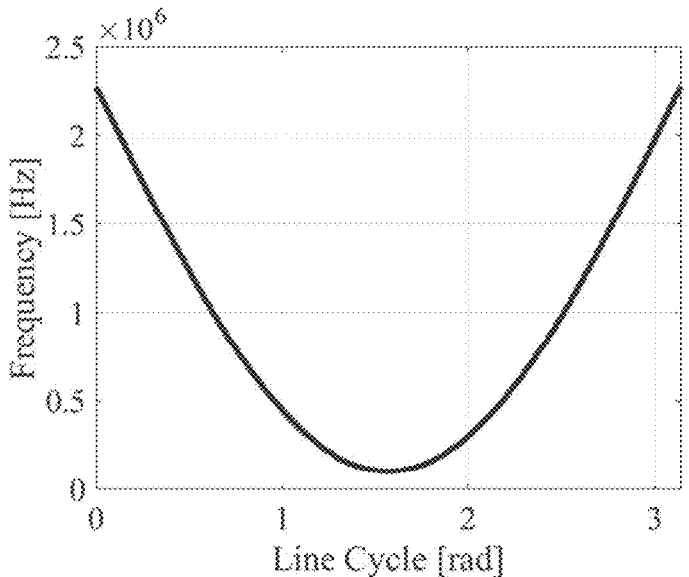
FIG. 1D shows the variation in switching frequency of the PFC boost rectifier of FIG. 1A over the line cycle.
Figure 2A:
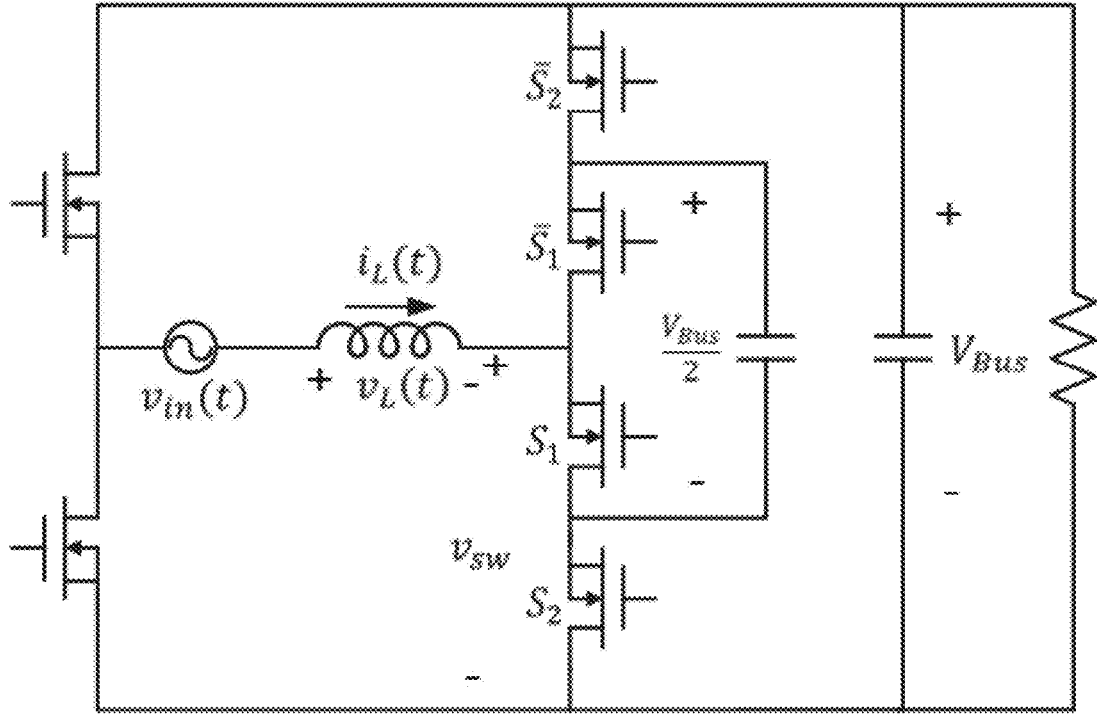
FIG. 2A shows a conventional three-level FCML boost converter.
Figure 2B:
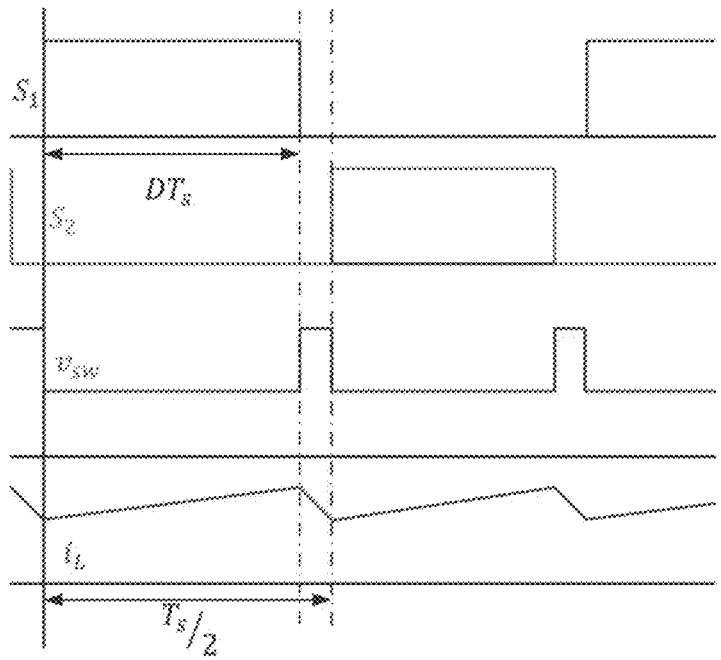
FIG. 2B and FIG. 2C schematically show operating waveforms of the three-level FCML boost converter of FIG. 2A.
Figure 2C:
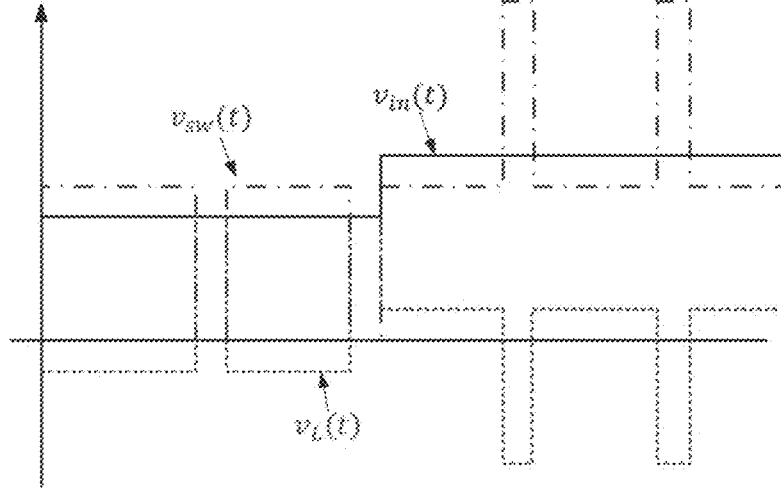

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. While the numerical ranges and parameters set forth for the broad scope of the present invention are approximations, the numerical value reported in the specific examples set forth as accurately as possible. However, any numerical values inherently contain certain errors necessarily the standard deviation found in the respective testing measurements caused. Also, as used herein, the term "about" generally means away from a given value or a range of 10%, 5%, 1% or 0.5%. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 5:
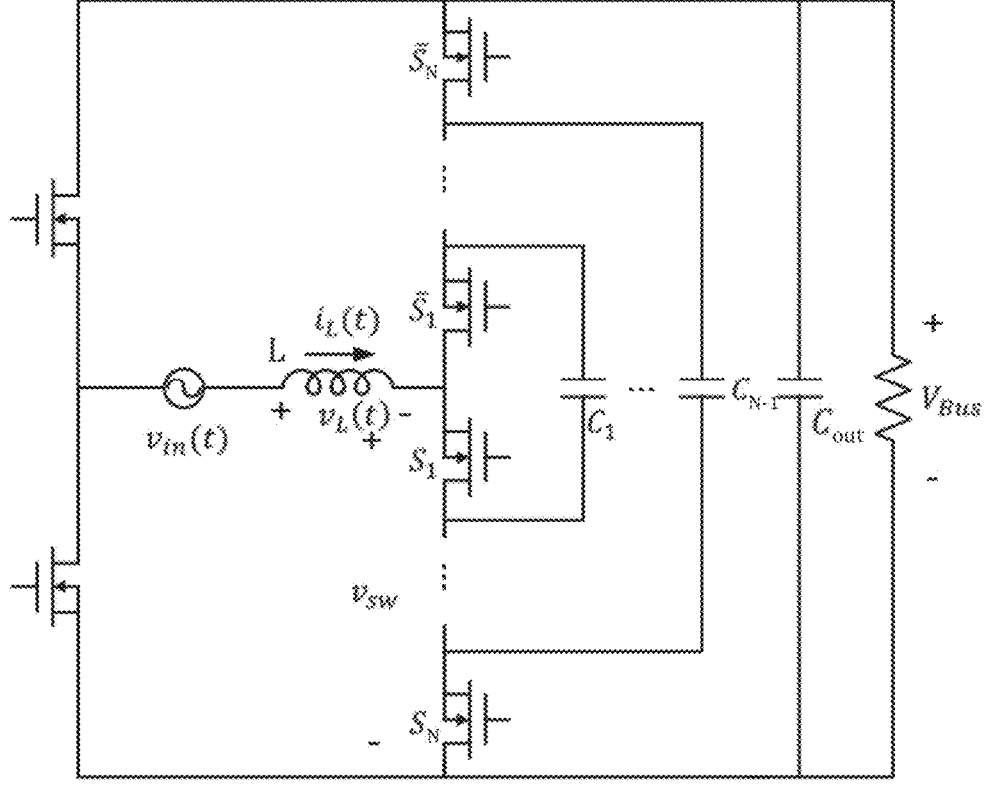
FIG. 5 is a schematic circuit diagram illustrating a FCML rectifier according to an embodiment of the present disclosure.

FIG. 5 is a schematic circuit diagram illustrating a FCML rectifier according to an embodiment of the present disclosure. As shown in FIG. 5, the FCML rectifier is configured to operate with an input voltage yin, and the FCML rectifier includes a switching converter stage and a control circuit (not shown). The switching converter stage has an input terminal, a first phase terminal, and a second phase terminal, and includes an inductor L, N upper switches $\overline{S}_1 \ldots \overline{S}_N$ lower switches $S_1 \ldots S_N$, N–1 flying capacitors $C_1 \ldots C_{N-1}$, and an output capacitor $C_{out}$, where N is an integer greater than 1. The FCML rectifier shown in FIG. 5 is a (N+1)-level rectifier. The inductor L is coupled to the input voltage $v_{in}$ and the input terminal. The N upper switches $\overline{S}_1 \ldots \overline{S}_N$ are electrically connected in series between the input terminal and the first phase terminal, and the first upper switch $\overline{S}_1$ and the Nth upper switch $\overline{S}_N$ are coupled to the input terminal and the first phase terminal respectively. The N upper switches $\overline{S}_1 \ldots \overline{S}_N$ operate with the same duty cycle. The N lower switches $S_1 \ldots S_N$ are electrically connected in series between the input terminal and the second phase terminal, and the first lower switch $S_1$ and the Nth lower switch $S_N$ are coupled to the input terminal and the second phase terminal respectively. The N lower switches $S_1 \ldots S_N$ operates in complementary to the N upper switches $\overline{S}_1 \ldots \overline{S}_N$ respectively. The nth flying capacitor $C_n$ is coupled between a common node between the nth and (n+1)th upper switches $\overline{S}_n$ and $\overline{S}_{n+1}$ and a common node between the nth and (n+1)th lower switches $S_n$ and $S_{n+1}$, where n is a positive integer less than N. The output capacitor $C_{out}$ is electrically connected between the first and second phase terminals. The control circuit is configured to provide control signals to operate the N upper switches $\overline{S}_1 \ldots \overline{S}_N$ and the N lower switches $S_1 \ldots S_N$. During the critical transition points, the control circuit is adapted to perform at least one of first and second modulation schemes. In the first modulation scheme, the control circuit controls any rising edge of the control signal of any one of the N lower switches $S_1 \ldots S_N$ to be synchronous with a rising edge of the control signal of at least one another of the N lower switches $S_1 \ldots S_N$ for achieving ZVS of the switches. In the second modulation scheme, the control circuit controls a phase-shift and a switching frequency of the switches to achieve ZVS of the switches with minimum conduction loss. The first and second modulation schemes would be described in detail as follows.

Figures 6A, 6B:
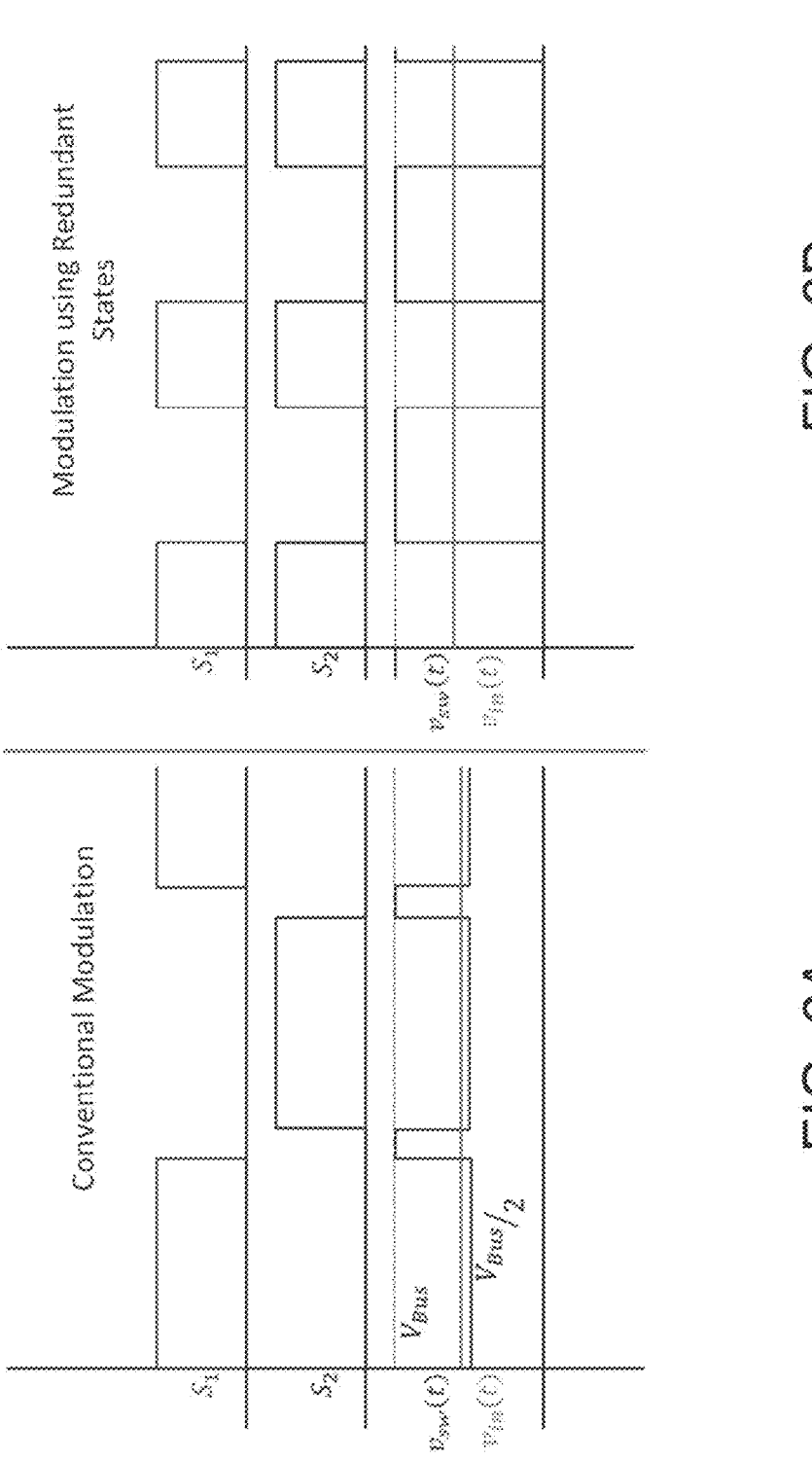
FIG. 6A schematically shows a conventional modulation scheme for the FCML rectifier during the critical transition points.
FIG. 6B schematically shows a first modulation scheme for the FCML rectifier during the critical transition points according to an embodiment of the present disclosure.

Taking the FCML rectifier of FIG. 5 with N equaling 2 as an example, FIG. 6A schematically shows a conventional modulation scheme for the FCML rectifier during the critical transition points, and FIG. 6B schematically shows a first modulation scheme for the FCML rectifier during the critical transition points according to an embodiment of the present disclosure. To circumvent the problem associated with loss of ZVS during the critical transition points (near $v_{in}(t)=V_{Bus}/2$) in the FCML rectifier, FIG. 6B introduces a new modulation scheme. In the first modulation scheme shown in FIG. 6B, the phase-shift between the rising edges of the control signals of the lower switches $S_1$ and $S_2$ is reduced from 180° to zero, which makes the switching node voltage $v_{sw}$ switch between 0, $V_{Bus}$, and the switches are in the redundant switching states. It should be noted that the duty cycle of the switches is still determined by the boosting relationship between input and output voltages, but the volt-seconds applied across the inductor L becomes much larger as a consequence of using the redundant switching states. It should also be noted that the frequency multiplication effect on the inductor L is not sustained anymore. When the redundant switching states are used, the ripple frequency of the inductor L becomes the same as the switching frequency of the switches. However, in the embodiment, since this modulation scheme is only used for a narrow range in the line cycle, this modulation scheme helps making the inductor current $i_L$ negative and achieving ZVS over the critical transition points in the FCML rectifier. The key difference between the conventional modulation scheme and the proposed first modulation scheme of the embodiment may be seen from FIG. 6A and FIG. 6B.

Figures 7A, 7B:
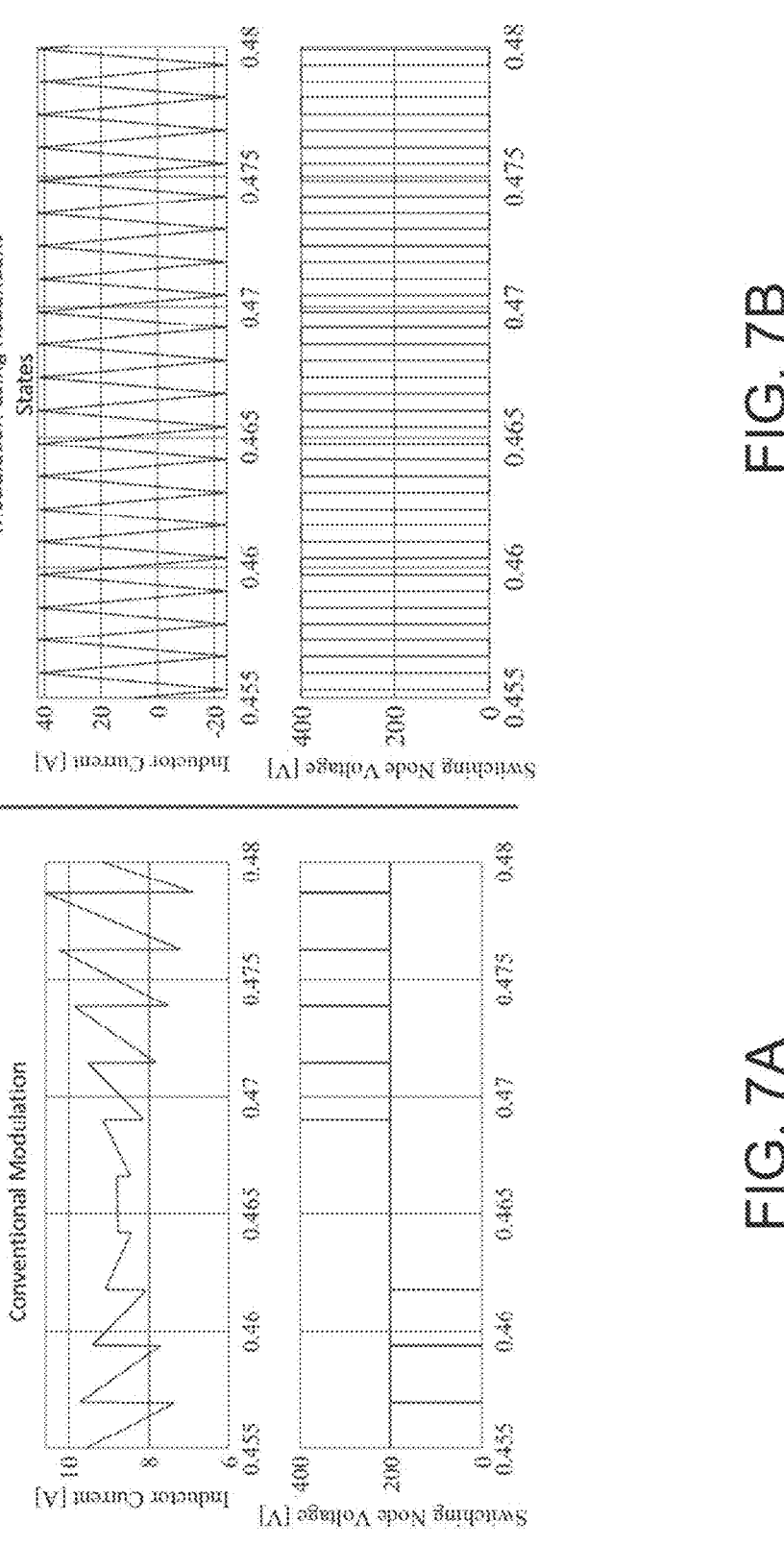
FIG. 7A schematically shows the waveforms of the switching node voltage and the inductor current while using the conventional modulation scheme of FIG. 6A during the critical transition points.
FIG. 7B schematically shows the waveforms of the switching node voltage and the inductor current while using the first modulation scheme of FIG. 6B during the critical transition points.

FIG. 7A schematically shows the waveforms of the switching node voltage and the inductor current while using the conventional modulation scheme of FIG. 6A during the critical transition points. FIG. 7B schematically shows the waveforms of the switching node voltage and the inductor current while using the first modulation scheme of FIG. 6B during the critical transition points. As shown in FIG. 7A and FIG. 7B, it is fairly obvious how the increased voltage at the switching node increases the inductor current ripple. It should also be noted that due to the increased voltage applied on the inductor L, the inductor ripple is relatively high even with a much higher switching frequency of the switches compared to the conventional modulation. However, since ZVS is achieved, the losses due to high frequency switching may be kept relatively small.

Figure 3:
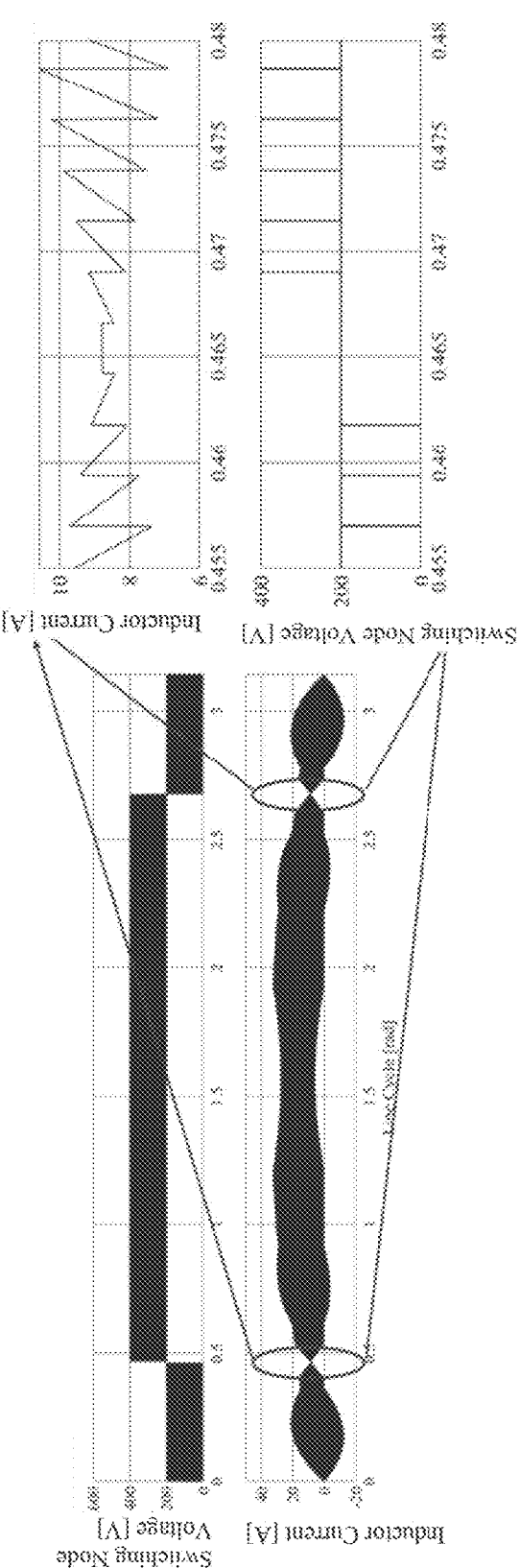
FIG. 3 schematically shows waveforms of the switching node voltage and the inductor current over the entire line cycle for a conventional three-level FCML boost converter.
Figure 4:
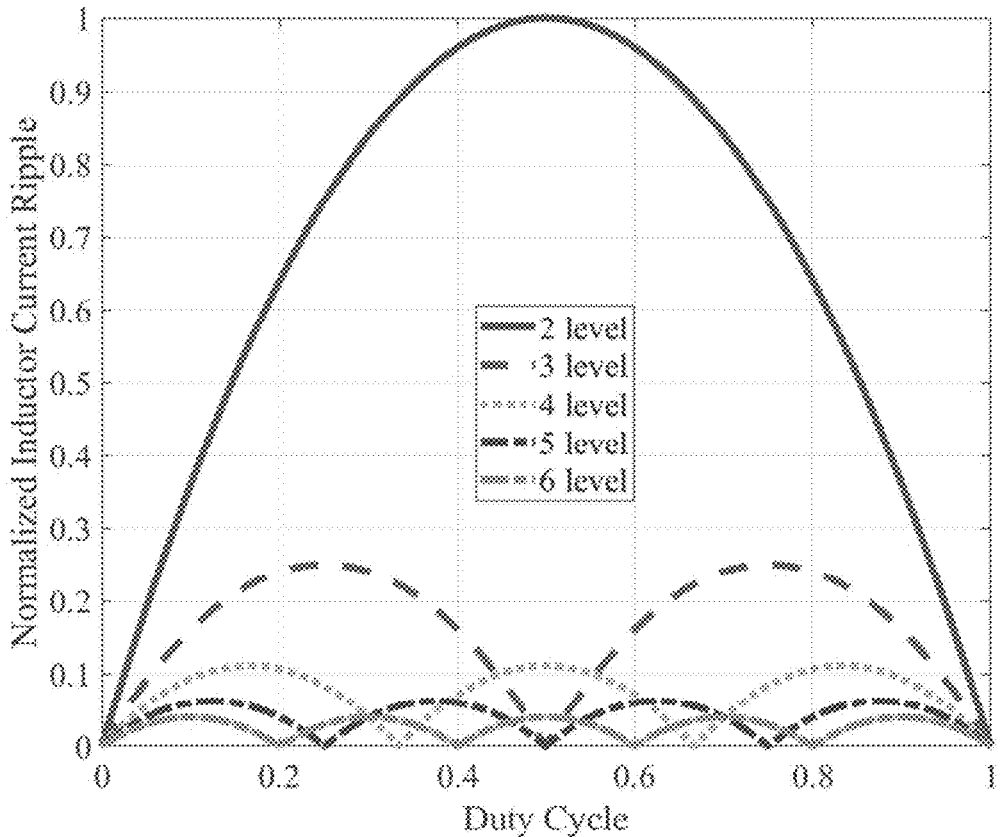
FIG. 4 shows the normalized current ripple in the boost inductor for the entire range of duty cycles in 2-6 level FCML PFC converters with conventional phase-shift modulation scheme.
Figure 8:
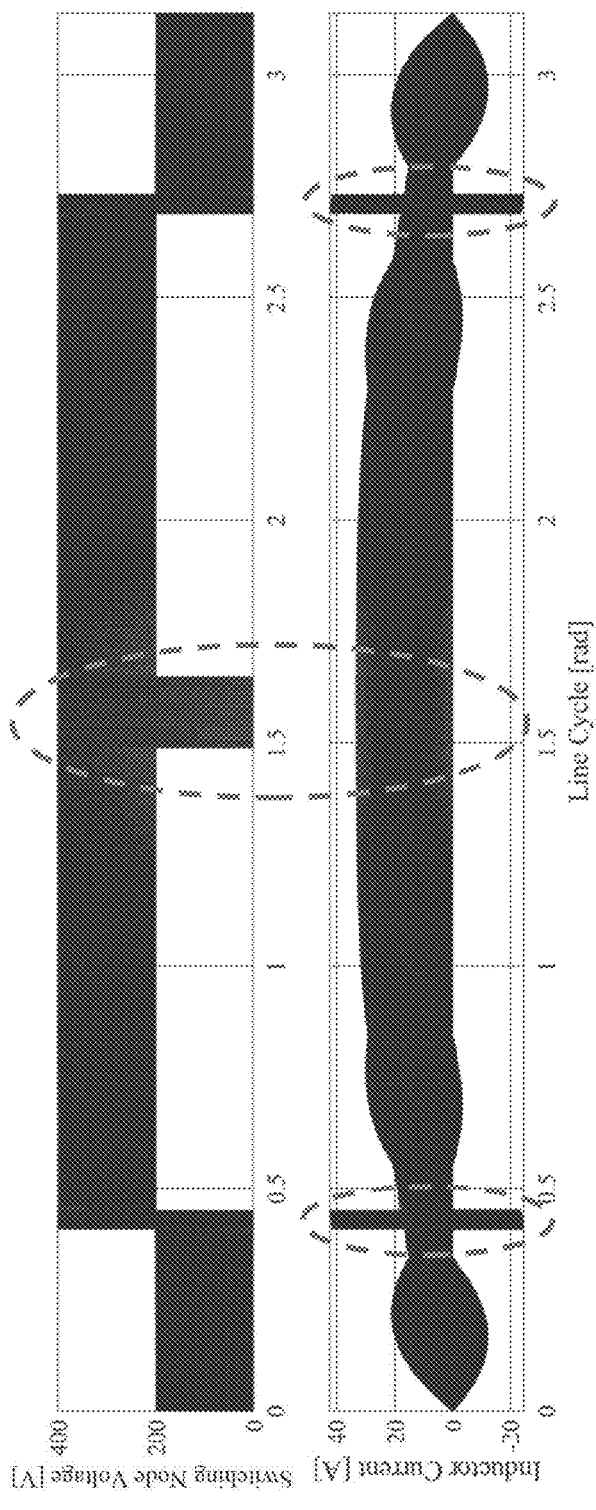
FIG. 8 shows the waveforms of the switching node voltage and the inductor current over the entire line cycle while using the first modulation scheme with redundant states during the critical transition points for the three-level FCML rectifier.

FIG. 8 shows the waveforms of the switching node voltage and the inductor current over the entire line cycle while using the first modulation scheme with redundant states during the critical transition points for the three-level FCML rectifier of an embodiment. In sharp contrast to FIG. 3, it should be noted that in this embodiment the inductor current is always touching the negative value, which essentially makes ZVS of the switches achievable throughout the entire line cycle. These waveforms are obtained with the same value of power stage inductance as the one used in FIG. 3. But, at the same time, near the critical transition points, the inductor current ripple is visibly higher than required to achieve ZVS. This excess current ripple is a result of less available switching states (and redundant states) in a three-level FCML rectifier. For higher-level converters, the other switching states may be intelligently utilized to reduce the excess current ripple in the inductor L.

Figure 9A:
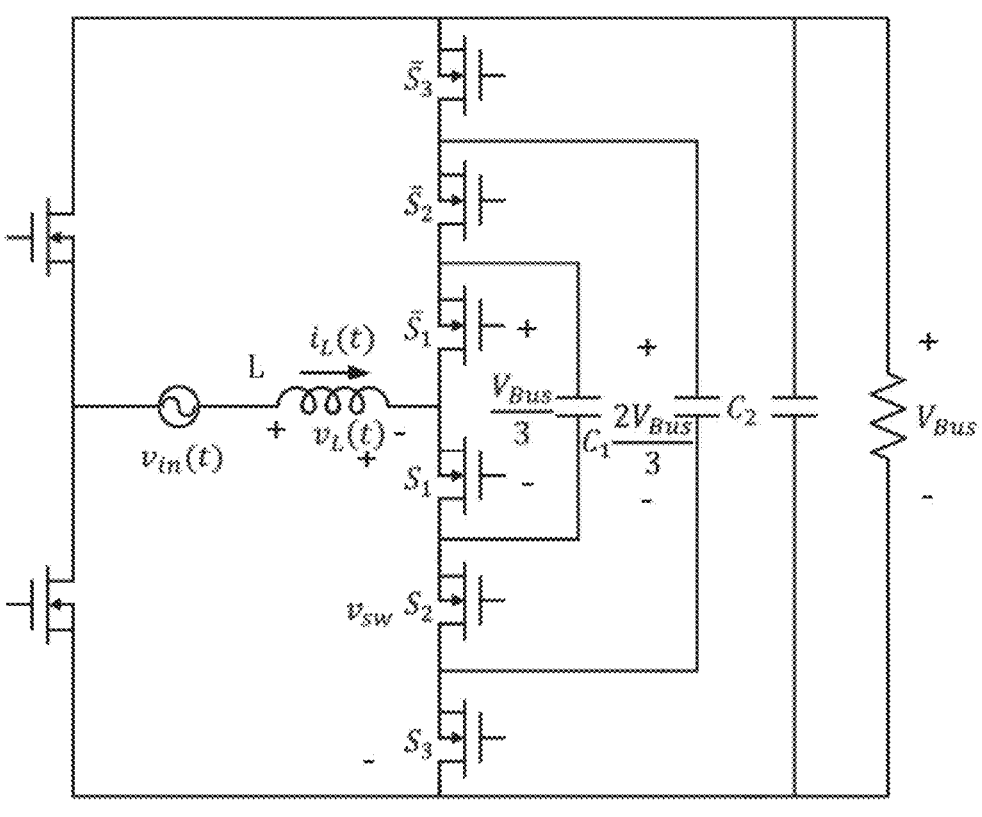
FIG. 9A shows a four-level FCML rectifier.
Figure 9B:
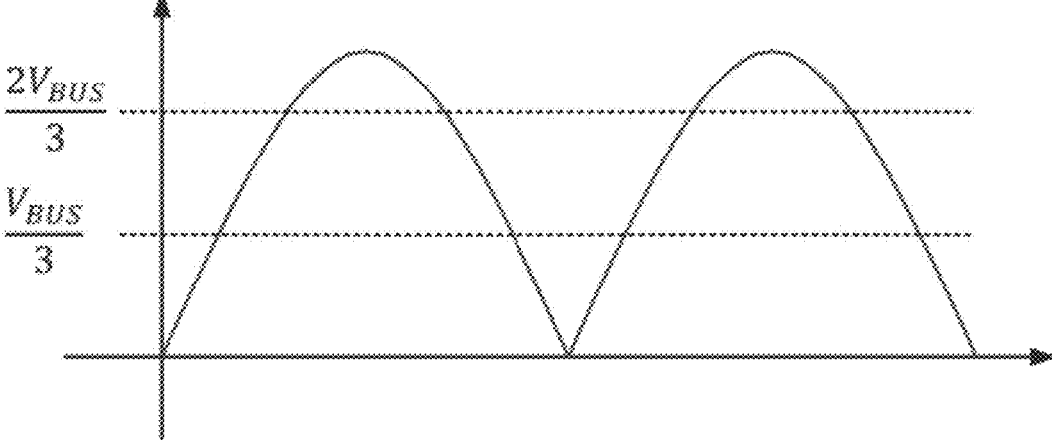
FIG. 9B schematically shows the input voltage of the four-level FCML rectifier of FIG. 9A over the entire line cycle.

As an example of more available switching states, FIG. 9A shows a four-level FCML rectifier (i.e., the FCML rectifier of FIG. 5 with N equaling 3). FIG. 9B schematically shows the input voltage of the four-level FCML rectifier over the entire line cycle. As shown in FIG. 9B, the four-level FCML rectifier has two critical transition points around $v_{in}(t)=V_{Bus}/3$ and $v_{in}(t)=2V_{Bus}/3$. But, since there are more available switching states in the four-level circuit compared to the three level one, now the additional switching states may be intelligently used to reduce the inductor current ripple to exactly what is required for enabling ZVS of the switches.

Figure 10A:
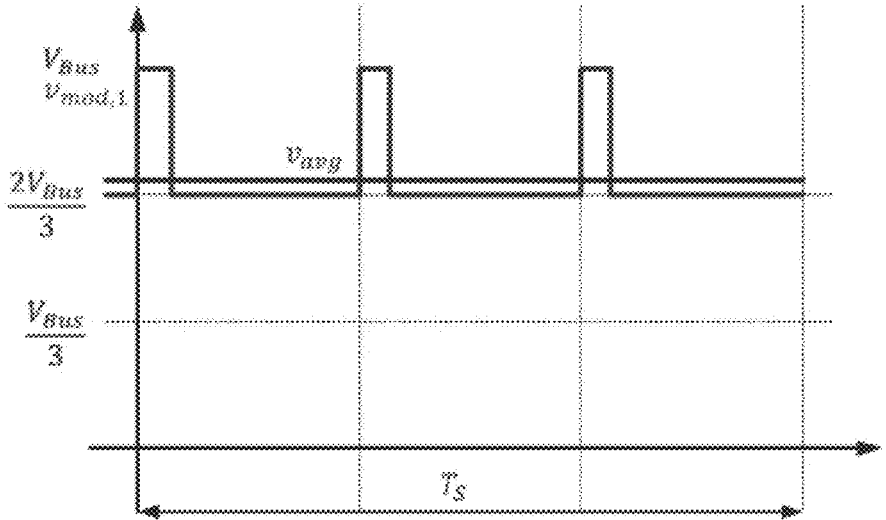
FIGS. 10A, 10B and 10C schematically show the conventional modulation scheme and two variants of the first modulation scheme of the present disclosure utilizing redundant states for the four-level FCML rectifier during the critical transition points with $v_{in}(t)=2V_{Bus}/3$.
Figure 10B:
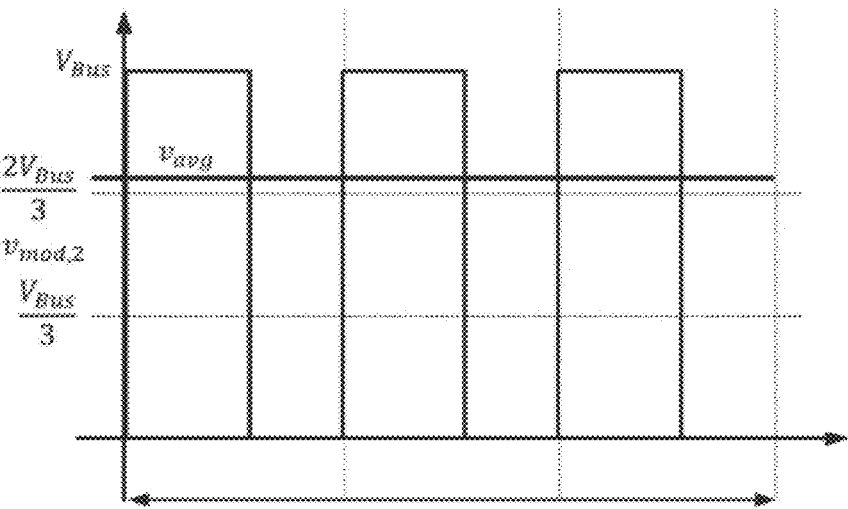
Figure 10C:
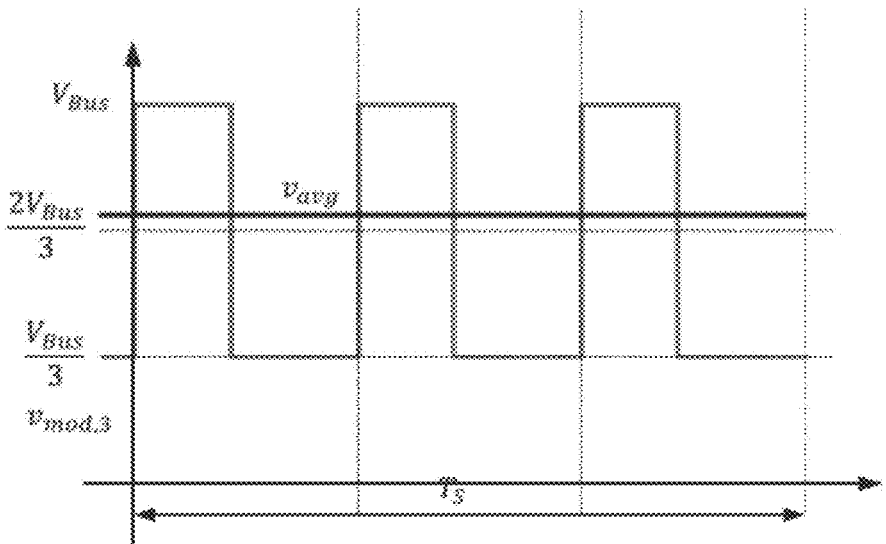
Figure 10D:
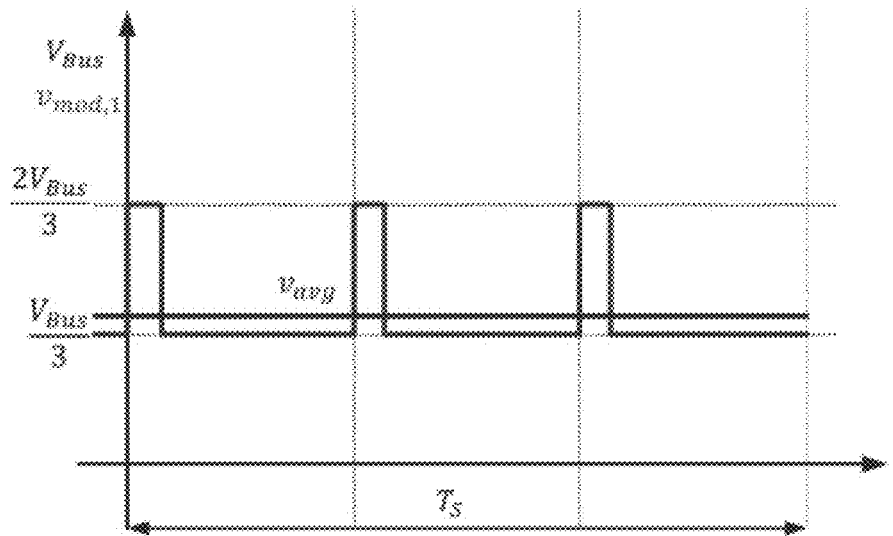
FIGS. 10D, 10E and 10F schematically show the conventional modulation scheme and two variants of the first modulation scheme of the present disclosure utilizing redundant states for the four-level FCML rectifier during the critical transition points with $v_{in}(t)=V_{Bus}/3$.
Figure 10E:
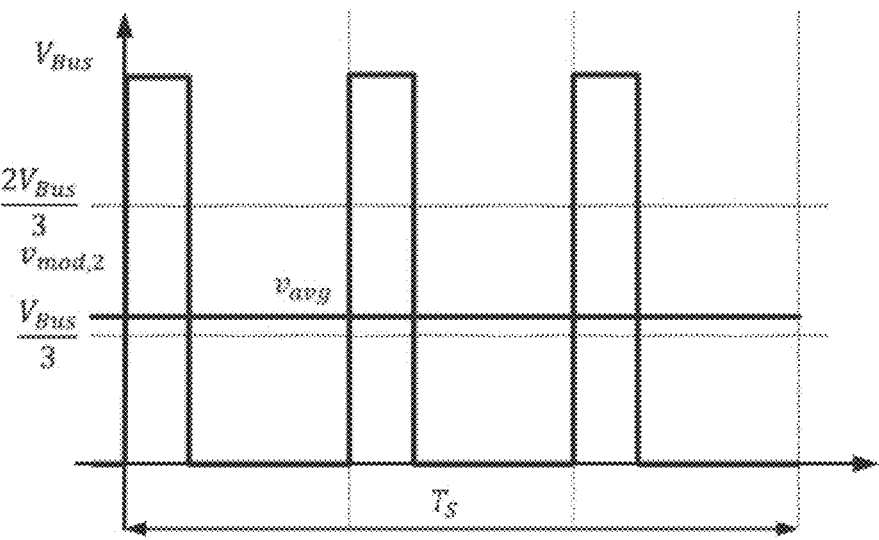
Figure 10F:
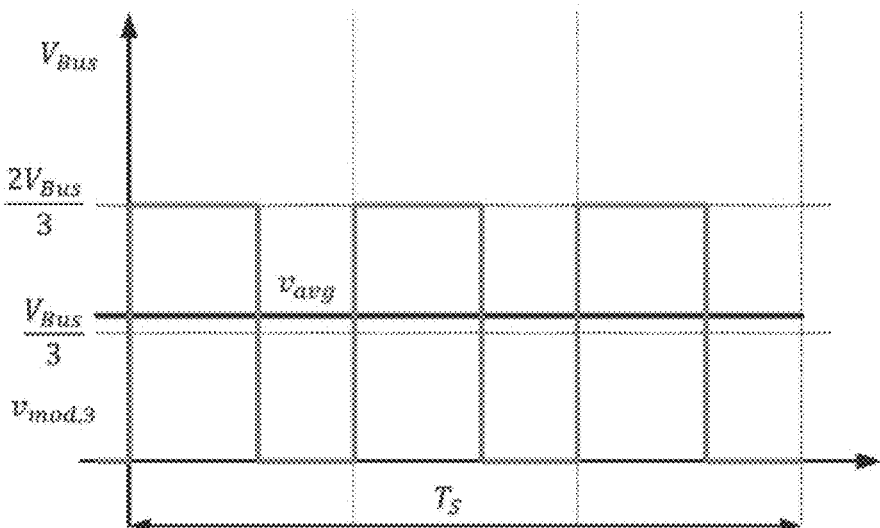

Exemplary switching waveforms are shown in FIGS. 10A-10C near $v_{in}(t)=2V_{Bus}/3$ and in FIGS. 10D-10F near $v_{in}(t)=V_{Bus}/3$. The proposed modulation 1 in FIGS. 10B and 10E and the proposed modulation 2 in FIGS. 10C and 10F are different variants of the first modulation scheme of the present disclosure. The proposed modulation 1 in both cases (FIG. 10B and FIG. 10E) shows the scenario where $(0, V_{Bus})$ redundant switching states are used to synthesize the input voltage. To keep the same effective frequency for the current ripple in the inductor L, this modulation requires a device switching frequency of $3f_0$. Here, $f_0$ is the switching frequency of the switches for standard conventional modulation as shown in FIG. 10A and FIG. 10D. However, FIG. 10C and FIG. 10F show the proposed modulation 2, where the redundant states just adjacent to the average voltage which needs to be synthesized at the switching node, is used to reduce the inductor current ripple. Utilizing these redundant states $((V_{Bus}/3, V_{Bus})$ for $v_{in}(t)=2V_{Bus}/3$ and $(0, 2V_{Bus}/3)$ for $v_{in}(t)=V_{Bus}/3)$ not only provides reduced switching frequency of the switches ($2f_0$ in this case), but also helps reducing inductor current ripple compared to proposed modulation 1. Furthermore, use of the appropriate redundant states also limits the dv/dt at the switching node, which results in better EMI performance compared to the modulation utilizing other switching states. Consequently, the proposed modulation 2 enables ZVS of the switches and reduces additional inductor current ripple during the critical transition points at the same time.

In an embodiment, in the first modulation scheme, the switching node voltage, across the N lower switches, may switch between a first voltage and a second voltage during the critical transition point around the input voltage equaling n*VBus/N, where the first voltage is between 0 and n*VBus/N, and the second voltage is between n*VBus/N and VBus. For example, the first voltage may be (n−1)*VBus/N, and the second voltage may be (n+1)*VBus/N.

Figure 11B:
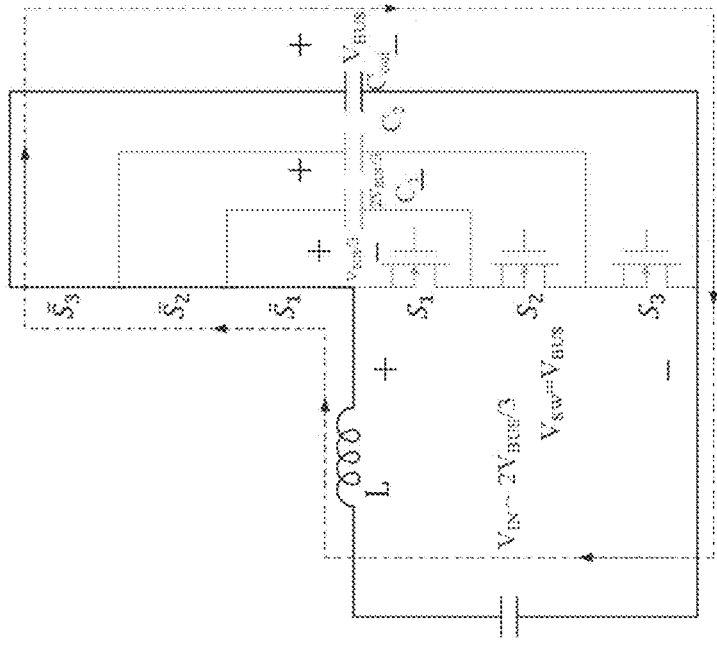
FIGS. 11A, 11B, 11C, 11D, 11E and 11F schematically show the sequence of switching states for the four-level FCML rectifier operating near $v_{in}=2V_{Bus}/3$.
Figure 11A:
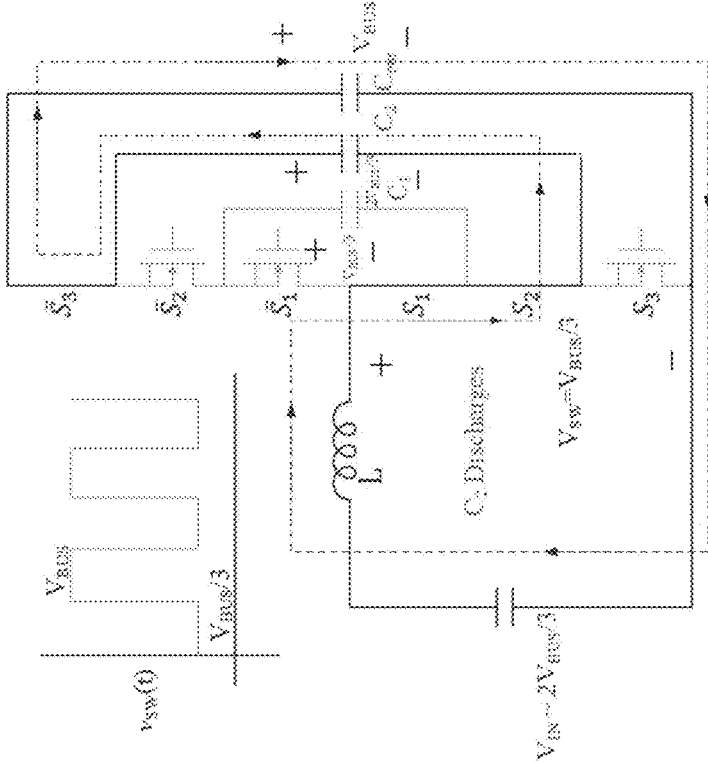
Figures 11C, 11D:
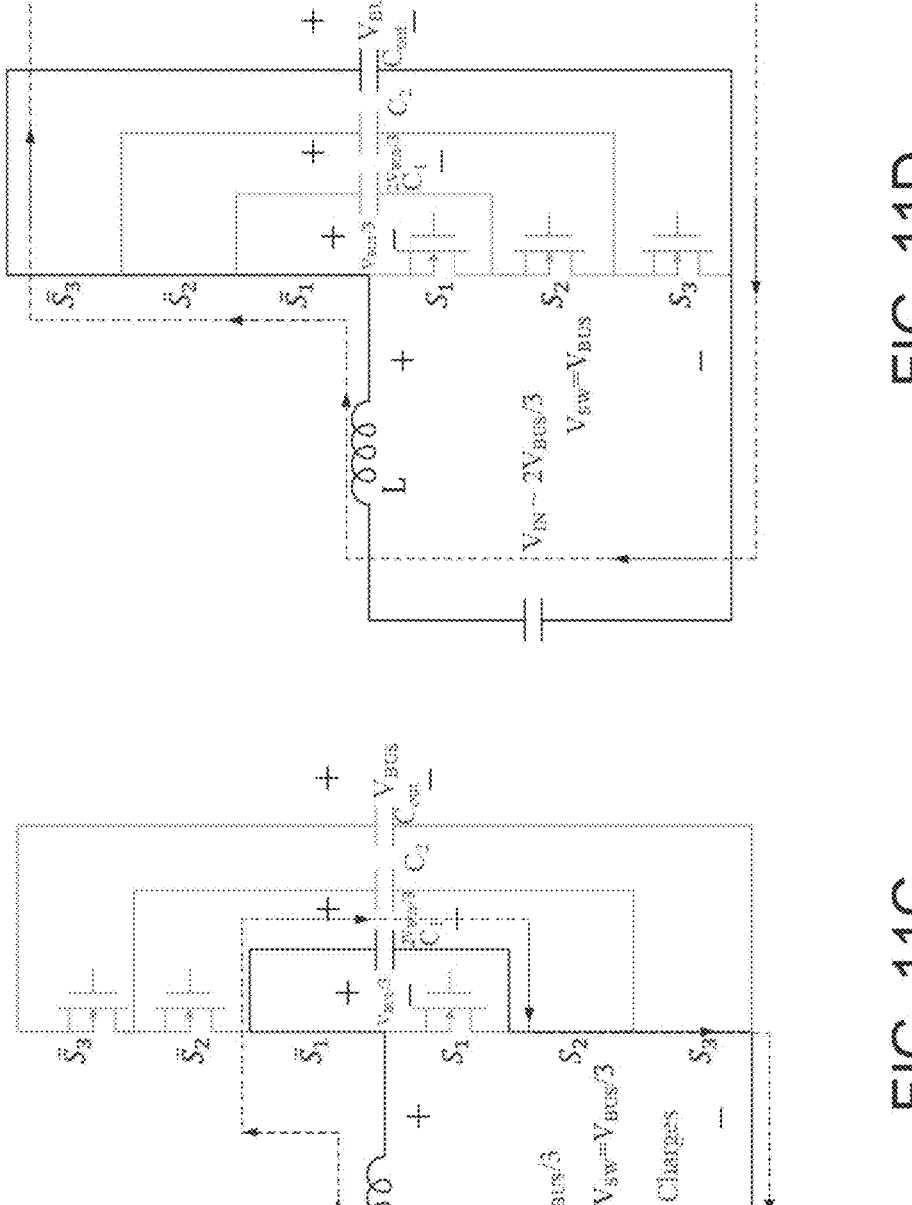
Figure 11F:
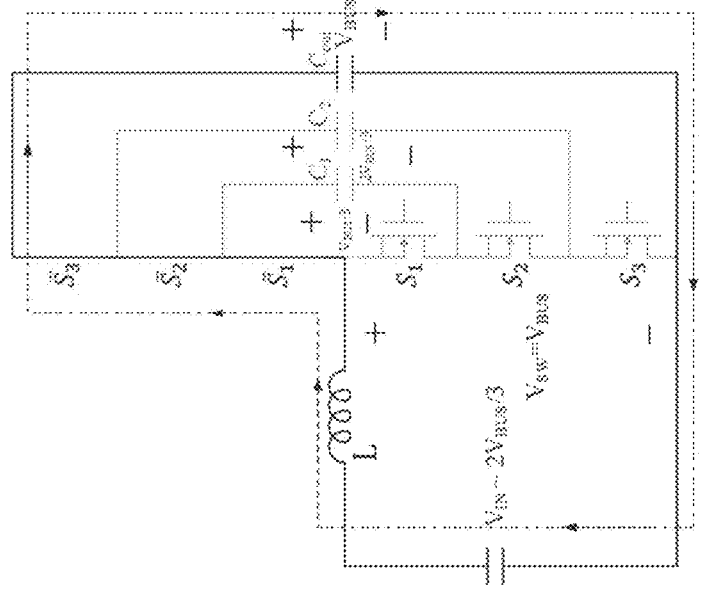
Figure 11E:
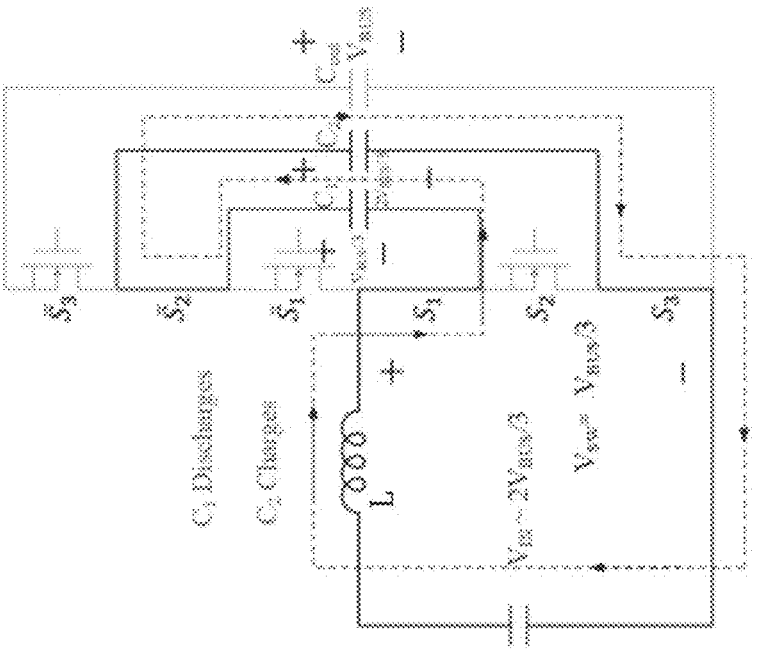

The switching combination used to synthesize the switching state should be carefully chosen in order to maintain charge balance in the flying capacitors. As shown in FIGS. 11A-11F for a four-level FCML rectifier (i.e., the FCML rectifier of FIG. 5 with N equaling 3) operating near $v_{in}=2V_{Bus}/3$, in the embodiment, the right sequence of switching states should ensure both charging and discharging of the flying capacitors in a switching cycle to facilitate voltage balancing. FIGS. 11A-11F show the correct transition of switching and utilizing the states $v_{sw}=V_{Bus}/3$ and $v_{sw}=V_{Bus}$ along with the charging and discharging paths for the flying capacitor voltages. The switching cycle starts from FIG. 11A, where switches $S_1$, $S_2$, $\overline{S}_3$ are on. This enacts the voltage of $V_{Bus}/3$ at the switching node. The current flow direction is marked in the figure. During this time, the flying capacitor $C_2$ discharges. In FIG. 11B, all the upper switches $\overline{S}_1$, $\overline{S}_2$, $\overline{S}_3$ are turned on to realize the voltage of $V_{Bus}$ at the switching node. Both flying capacitors $C_1$ and $C_2$ are inactive in this state. Both switch pairs $S_1$, $\overline{S}_1$ and $S_2$, $\overline{S}_2$ change states during this interval. Then, in FIG. 11C, the next switching state is shown, where switch pairs $S_2$, $\overline{S}_2$ and $S_3$, $\overline{S}_3$ change states. During this state, the flying capacitor $C_1$ gets charged according to the current flow direction, and the applied switching node voltage is $V_{Bus}/3$. During the next state shown in FIG. 11D, again all the upper switches $\overline{S}_1$, $\overline{S}_2$, $\overline{S}_3$ are on by commutation of the switch pairs $S_2$, $\overline{S}_2$ and $S_3$, $\overline{S}_3$. The applied switching node voltage becomes $V_{Bus}$, and none of the flying capacitors $C_1$ and $C_2$ participate in the current path. In FIG. 11E, the switch pairs $S_1$, $\overline{S}_1$ and $S_3$, $\overline{S}_3$ commutate to generate the switching node voltage of $V_{Bus}/3$. In this state, from the current path it can be seen that the flying capacitor $C_1$ is discharged and the flying capacitor $C_2$ is charged. Finally, in FIG. 11F, the switching cycle is complete by commutation of the switch pairs $S_1$, $\overline{S}_1$ and $S_3$, $\overline{S}_3$. In this period, the applied switching node voltage becomes $V_{Bus}$ again, and none of the flying capacitors $C_1$ and $C_2$ is charged or discharged. After this, the FCML rectifier goes back to the state shown in FIG. 11A by commutation of switch pairs $S_1$, $\overline{S}_{11}$ and $S_2$, $\overline{S}_2$.

Figure 12A:
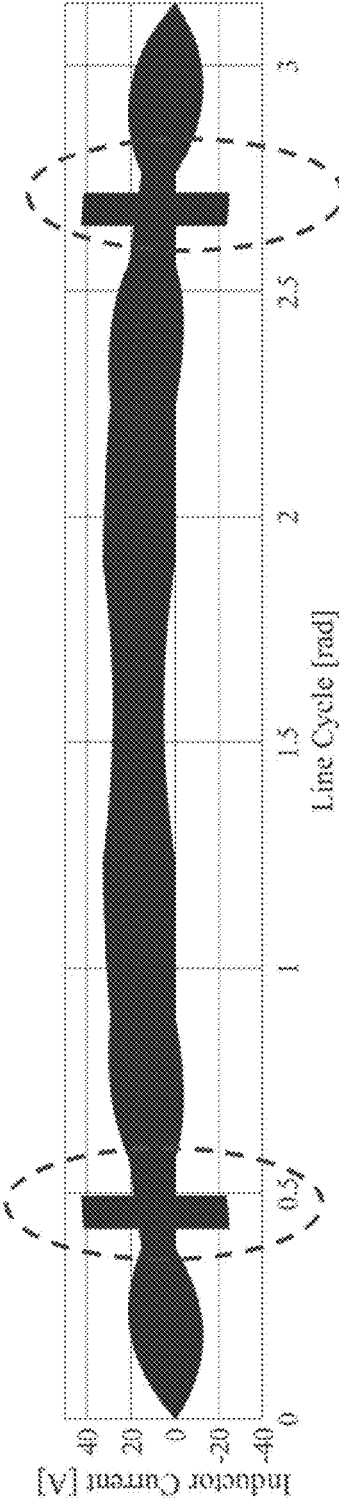
FIG. 12A shows the waveforms of the inductor current over the entire line cycle while using the first modulation scheme with redundant states during the critical transition points for the three-level FCML rectifier.
Figures 12B, 12C, 12D:
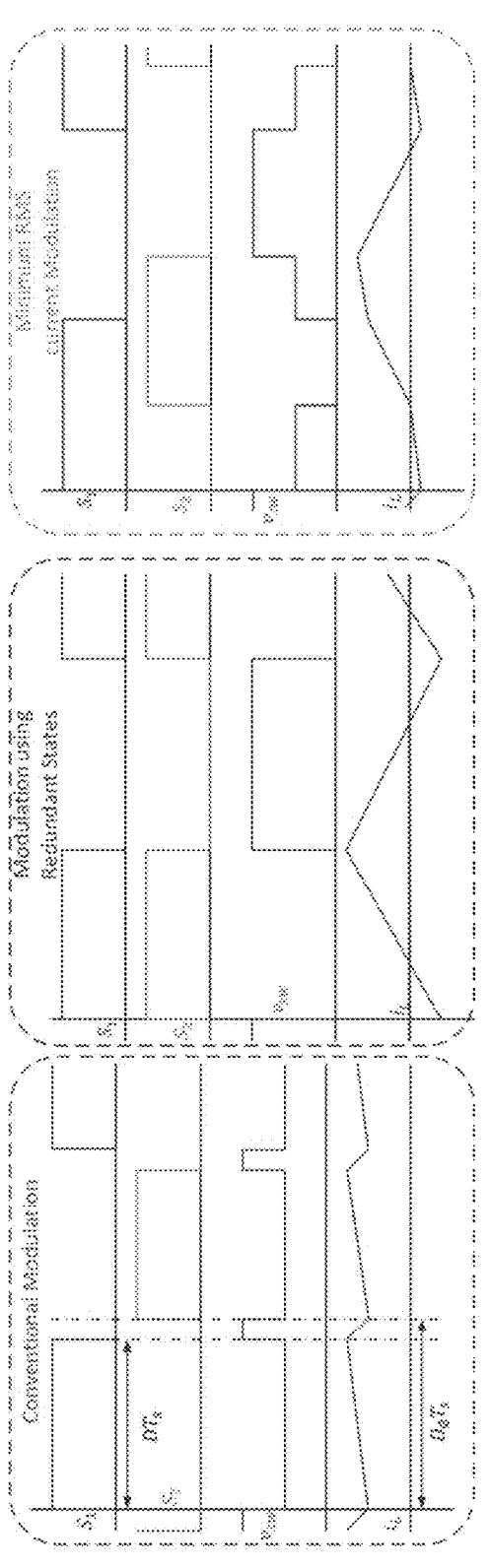
FIGS. 12B, 12C and 12D schematically show the conventional modulation scheme and first and second modulation schemes of the present disclosure for the three-level FCML rectifier during the critical transition points.

FIG. 12A further emphasizes the problem with the proposed first modulation scheme for a three-level FCML rectifier (i.e., the FCML rectifier of FIG. 5 with N equaling 2). For a three-level FCML rectifier of an embodiment, the available states of the switching node voltage are 0, $V_{Bus/2}$ and $V_{Bus}$. As seen in the switching waveform during the line cycle, when the proposed first modulation scheme using redundant switching states is enabled near $v_{in}(t)=V_{Bus}/2$, the excess volt-seconds applied on the inductor L makes the current ripple much higher than required. This feature is attributed to the fact that the phase-shift between rising edges of the control signals of switches $S_1$ and $S_2$ is abruptly reduced from 180° to zero, resulting in very high current ripple. In FIG. 12B and FIG. 12C, the two extreme cases are pointed out graphically, where the volt-seconds applied across the inductor L are really small and high under the 180° phase-shift and the 0 phase-shift respectively. As a compromise, a phase-shift between 0 and 180° would result in a controlled volt-seconds applied on the inductor L. The controllable parameter is denoted as $$D_\phi T_s = \frac{\phi}{360°} T_s,$$

where Ø is the phase-shift. The current ripple in the inductor L (i.e., the inductor current ripple) can be controlled through using the variable $D_\varnothing$ and the switching frequency $$f_s = \frac{1}{T_s}.$$

For D≤0.5 and D≥$D_\varnothing$:

$$\Delta i_L = \frac{V_{Bus}}{Lf_s} D(1 - D - D_\phi), \tag{2}$$

where $\Delta i_L$ is the inductor current ripple. Similarly, for D≥0.5 and D≥$D_\varnothing$:

$$\Delta i_L = \frac{V_{Bus}}{Lf_s}(1 - D)(D - D_\phi). \tag{3}$$

As the duty cycle D is still governed by the output voltage control (i.e., $D=1-v_{in}(t)/V_{Bus}$), and the required inductor current ripple $\Delta i_L$ enabling boundary conduction mode operation is approximately twice of the average inductor current ($\Delta i_L=2\langle i_L\rangle$). Equations (2) and (3) can be used to optimally pick the phase-shift Ø and switching frequency $f_s$ in conjunction to achieve the objective of achieving ZVS while at the same time reduce additional conduction losses in the system. This modulation scheme is marked as the minimum RMS current modulation in FIG. 12D, and this modulation scheme is the second modulation scheme of the present disclosure stated above.

Figures 13A, 13B:
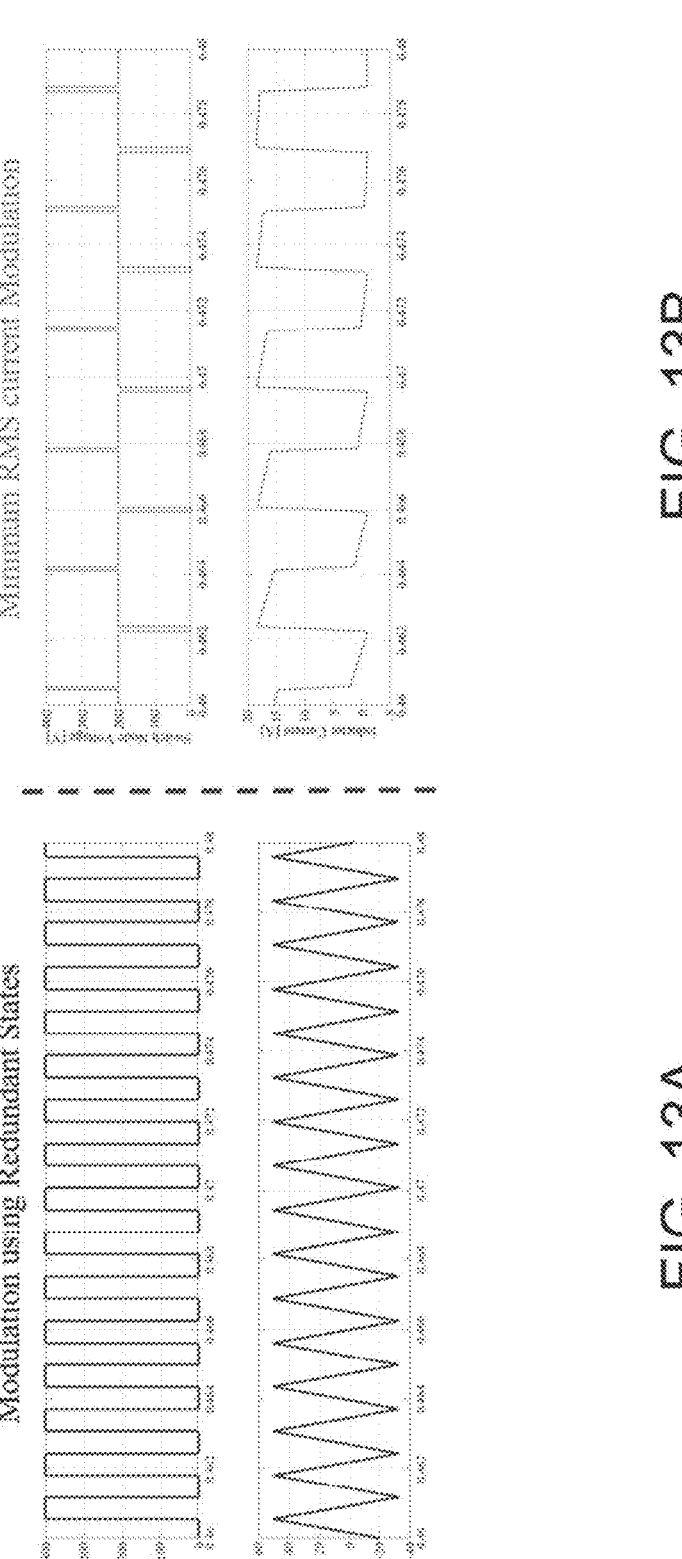
FIG. 13A shows the waveforms of the switching node voltage and the inductor current of the three-level FCML rectifier during the critical transition points under the first modulation scheme of the present disclosure.
FIG. 13B shows the waveforms of the switching node voltage and the inductor current of the three-level FCML rectifier during the critical transition points under the second modulation scheme of the present disclosure.
Figure 13C:
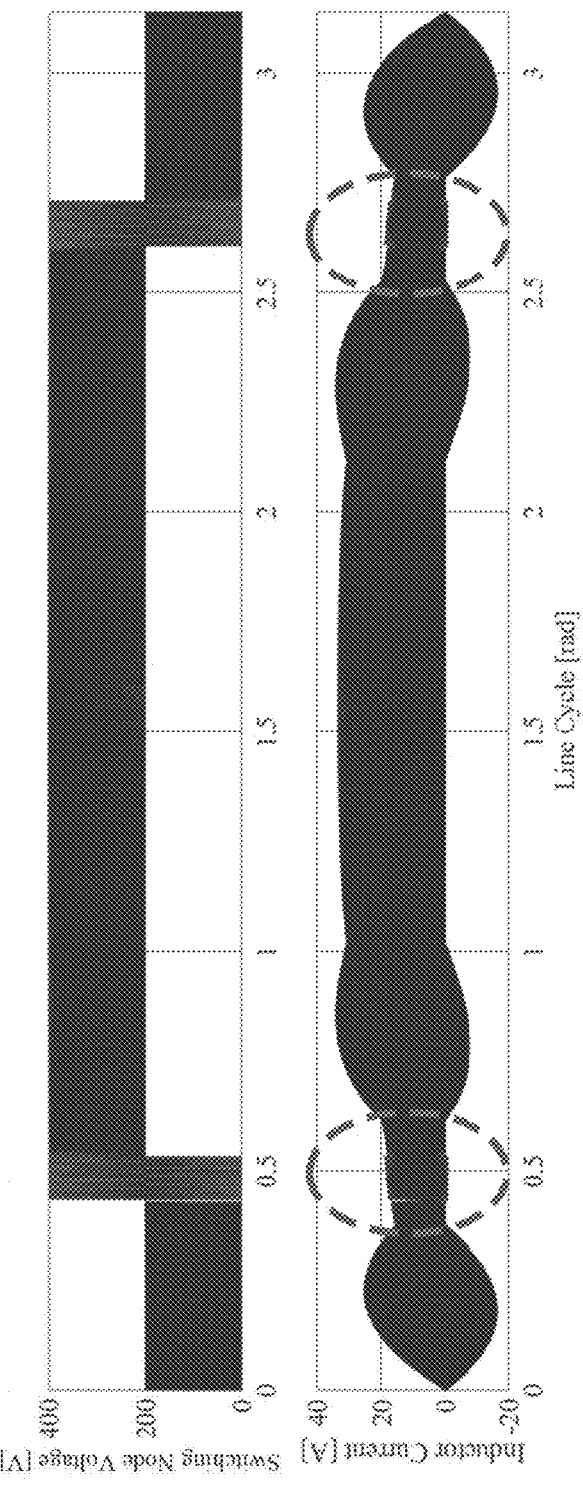
FIG. 13C shows the waveforms of the switching node voltage and the inductor current over the entire line cycle while using the second modulation scheme during the critical transition points for the three-level FCML rectifier.

FIG. 13A shows the zoomed-in waveforms near the critical transition point under the first modulation scheme with $D_\varnothing=0$, $f_s=f_{s,max}$. FIG. 13B shows the zoomed-in waveforms near the critical transition point under the second modulation scheme where $D_\varnothing$ and $f_s$ are picked to realize ZVS with minimum conduction losses (i.e., minimum RMS current stress). An exemplary line cycle waveform illustrating this second modulation scheme (i.e., the minimum rms current modulation) for a three-level FCML rectifier is shown in FIG. 13C. In contrast to FIG. 12A it is clearly observed that the inductor current ripple is kept just high enough to enable boundary conduction mode operation during the critical transition points where $v_{in}(t)=V_{Bus}/2$.

Figure 14:
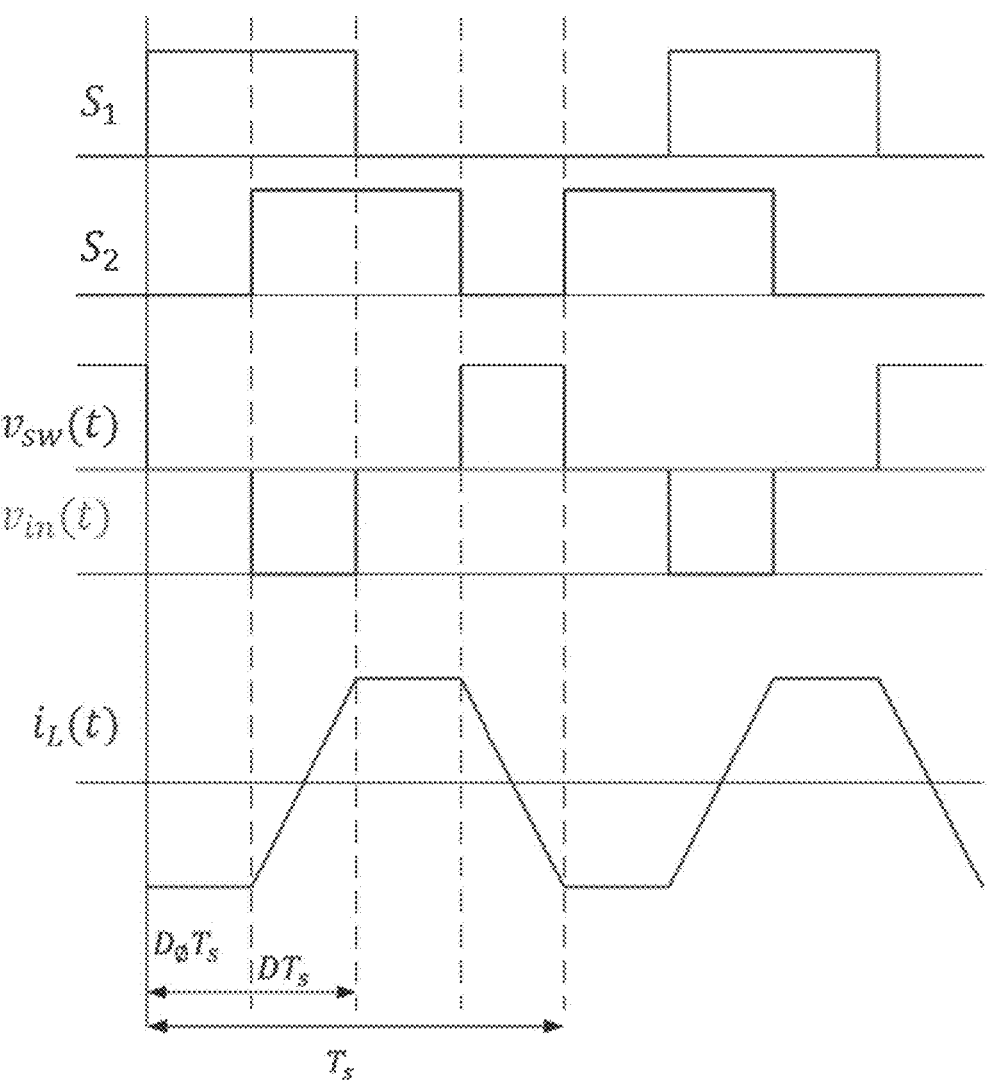
FIG. 14 schematically shows an implementation of the second modulation scheme proposed in FIG. 12D.

In the embodiment, to ensure that the flying capacitor voltage remains at $V_{Bus}/2$ during the phase-shift modulation, period doubling modulation needs to be enabled as shown in FIG. 14. It should be noted how the control signals of switches $S_1$ and $S_2$ interchange in two consecutive switching periods. In the first period, switch $S_1$ is gated ahead of switch $S_2$, while in the next period, switch $S_2$ is gated earlier than switch $S_1$. This strategy helps balance the flying capacitor voltage as indicated in "DC-link Capacitor Voltage Balancing Control for Series Half Bridge LLC Resonant Converter," 2020 *IEEE Applied Power Electronics Conference and Exposition (APEC)*, 2020".

It should also be observed that many possible combinations of $D_\Theta$ and $f_s$. enable the same inductor current ripple from the equations (2) and (3). As an example, FIG. 15A and FIG. 15B show the same critical transition point achieving boundary conduction mode operation with similar inductor current ripple for two different choice of control variables $D_\Theta$ and $f_s$. In this case, the duty cycle D is greater than 0.5. Similarly, in FIG. 15C and FIG. 15D, two different combinations of $D_\Theta$ and $f_s$. are used to achieve similar inductor current ripple. The major difference in this case is that the duty cycle D is less than 0.5. In some embodiments, from these different operating choices, the switching frequency and phase shift are chosen based on practical considerations. For example, the switching frequency $f_s$ should have a maximum bound, also any abrupt change in the phase-shift should be avoided to mitigate undesirable transients in the flying capacitor voltage and inductor current.

Figure 16:
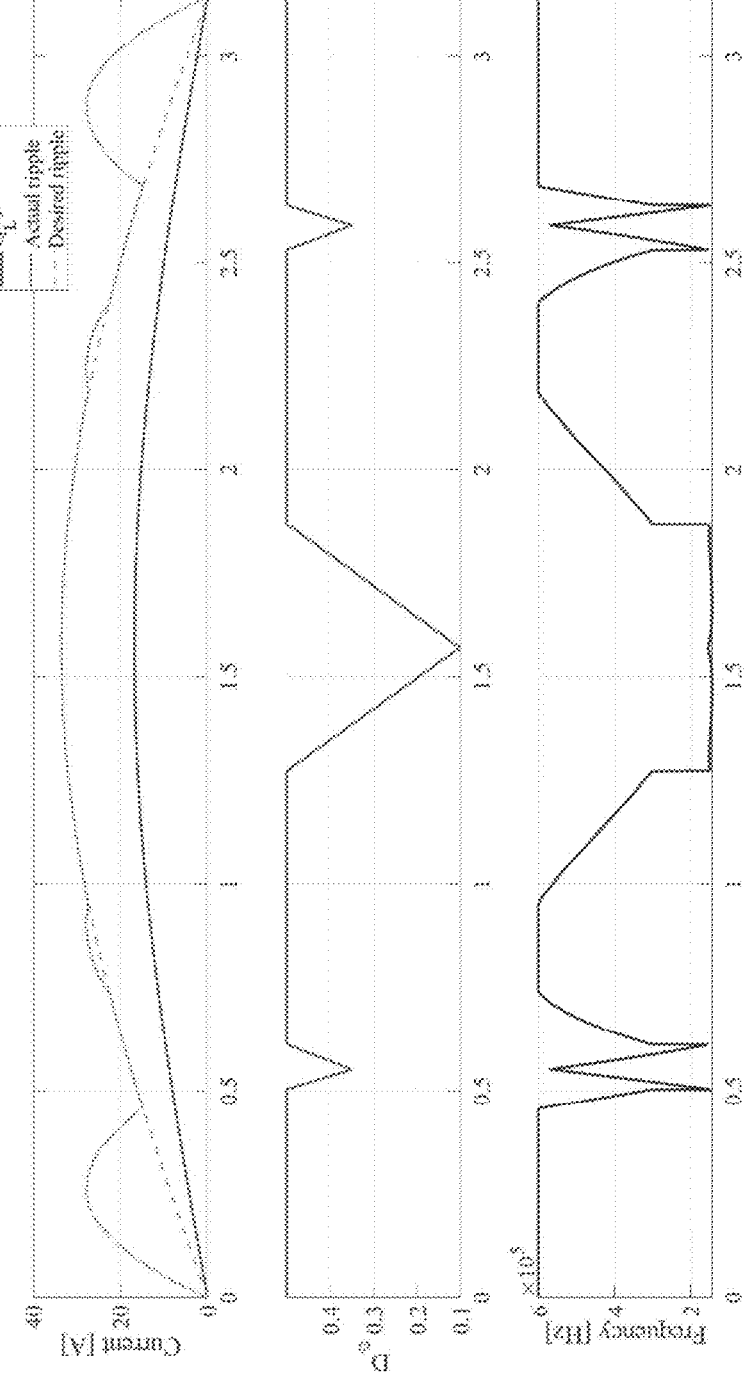
FIG. 16 shows an exemplary control strategy where the phase-shift variable $D_\Theta$ and the switching frequency $f_s$ are used in conjunction to make the actual current ripple equal to the desired current ripple.

FIG. 16 shows an exemplary control strategy where the phase-shift variable $D_\Theta$ and the switching frequency $f_s$ are used in conjunction to make the actual current ripple equal to the desired current ripple, which makes the second modulation scheme optimal in terms of RMS current stress and achieving ZVS. It should be observed here, how the phase-shift variable $D_\Theta$ is varied linearly near the critical transition points where $v_{in}(t)=V_{Bus}/2$. For a linear profile of $D_\Theta$, the switching frequency $f_s$ can be calculated using the equations (2) or (3) depending on what the duty cycle D is.

In some embodiments, it is important to denote that the flying capacitor voltage and inductor current do not see any abrupt transient resulting from this modulation scheme as the variables are changed smoothly. Also, during the entire line cycle operation in some embodiments, the switching frequency may be always clamped below some maximum allowable limit, which is dictated by the inductor design of the rectifier. Due to this effect, as can be seen from the actual current ripple profile, sometimes the inductor current ripple is higher than the desired value.

Figure 17:
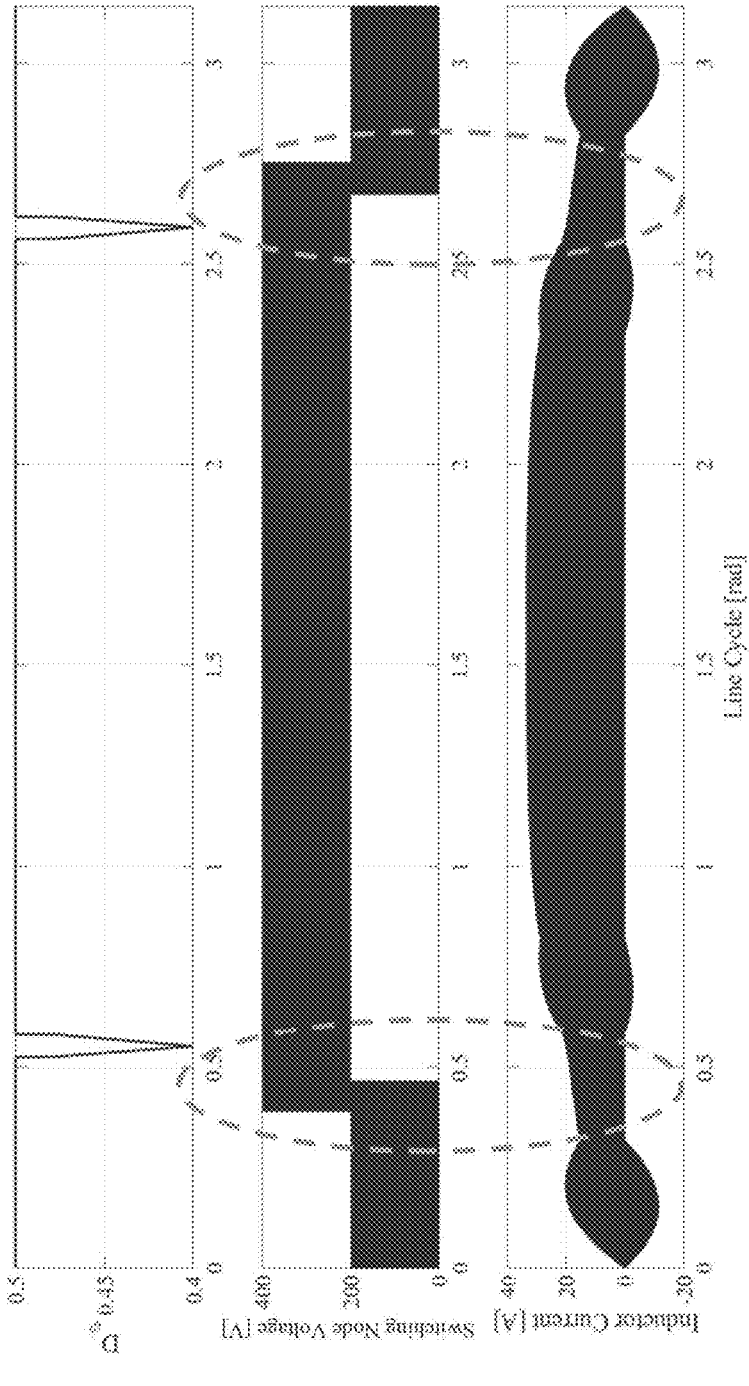
FIG. 17 shows the waveforms of the inductor current and switching node voltage along with the control variable $D_\Theta$.

In one embodiment, FIG. 17 shows the switching waveforms (i.e., the waveforms of the inductor current and switching node voltage) along with the control variable $D_\Theta$. FIG. 17 clearly shows how the inductor current ripple is well reduced to only the required amount by using modulation scheme of FIG. 12D implemented as shown in FIG. 16. It can be observed that there is no significant overshoot in the inductor current where the second modulation scheme is employed to ensure ZVS. Overall, the inductor current appears smooth. The sharp contrast of this waveforms with that shown in FIG. 12A is encircled, showing how the RMS current is controlled by using the proposed modulation scheme of the embodiment.

Figure 18A:
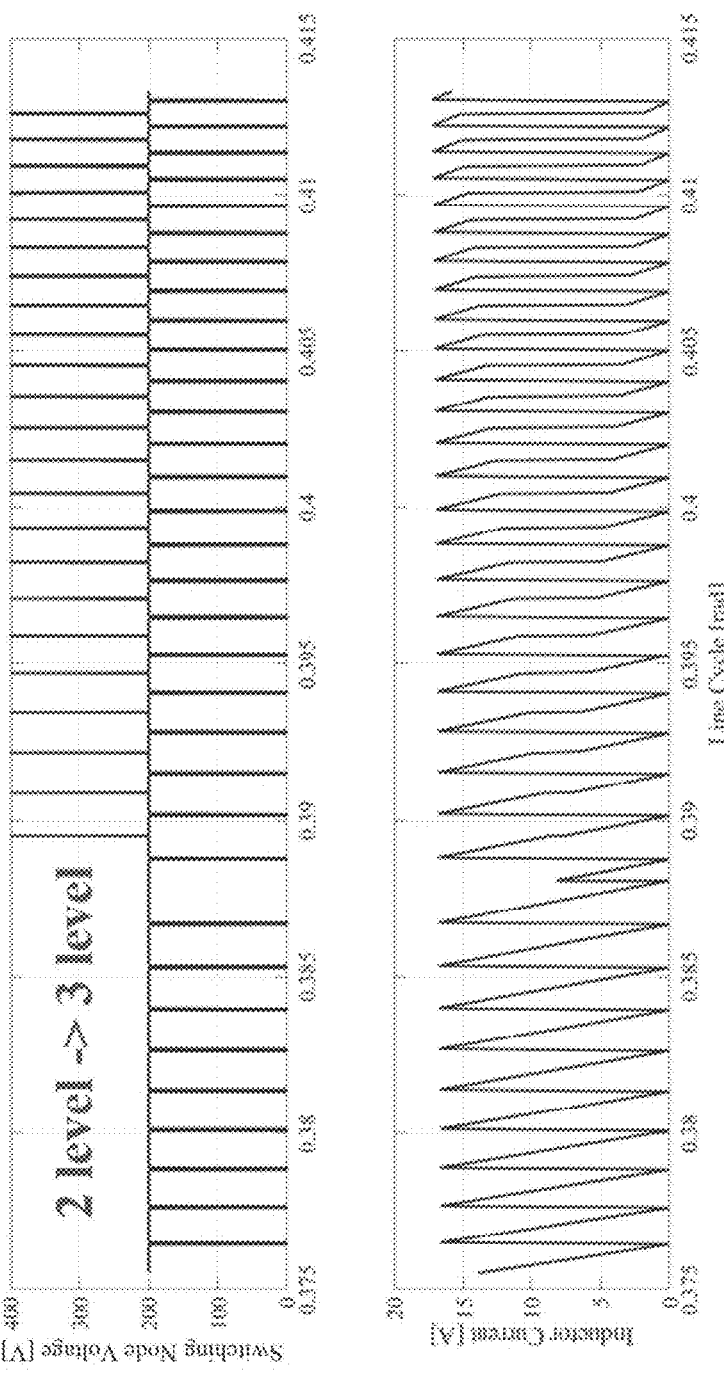
FIG. 18A and FIG. 18B show transition waveforms between two-level and three-level switching through using the phase-shift variable $D_\Theta$ in the proposed modulation scheme of FIG. 12D.
Figure 18B:
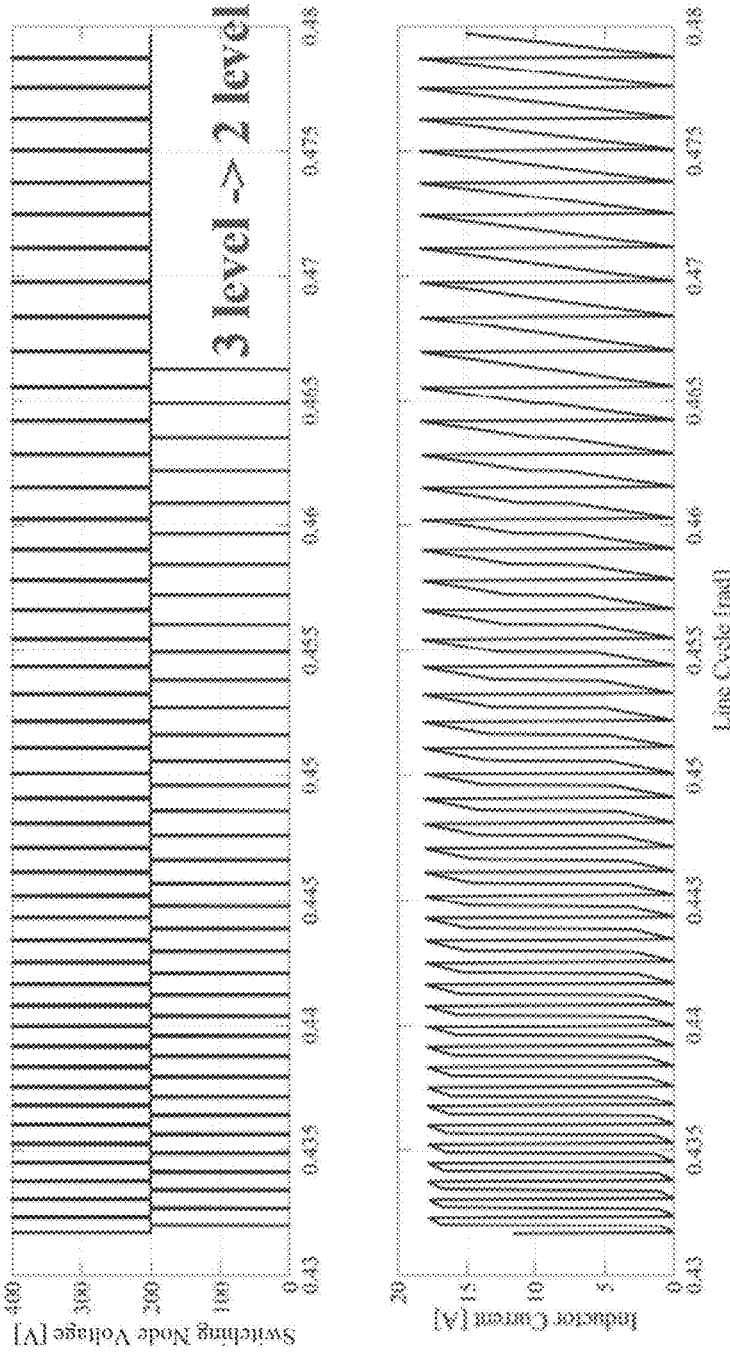

In addition, FIG. 18A and FIG. 18B show transition waveforms between two-level and three-level switching through using the phase-shift variable $D_\Theta$ in the proposed modulation scheme of the embodiment of FIG. 12D. In particular, FIG. 18A shows the smooth transition from two-level switching to three-level switching, and FIG. 18B shows the opposite smooth transition from three-level switching to two-level switching. These transitions are important to ensure that the FCML rectifier can achieve ZVS by using the second modulation scheme without any abrupt dynamics in the capacitor voltage or inductor current. Both transitions look normal and do not cause undesirable effects in the inductor current or capacitor voltage.

Figure 19:
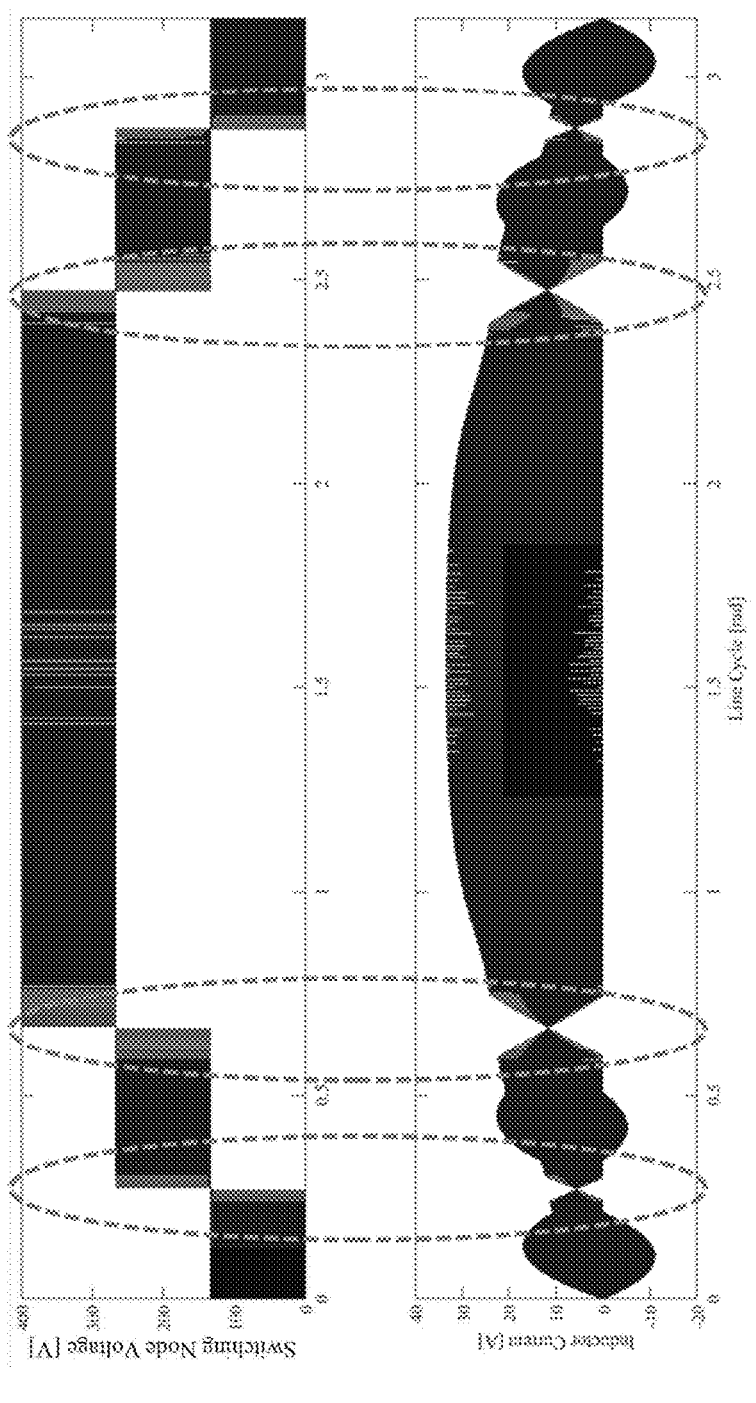
FIG. 19 shows the waveforms of the switching node voltage and the inductor current over the entire line cycle while using the conventional modulation scheme during the critical transition points for the four-level FCML rectifier.
Figure 20A:
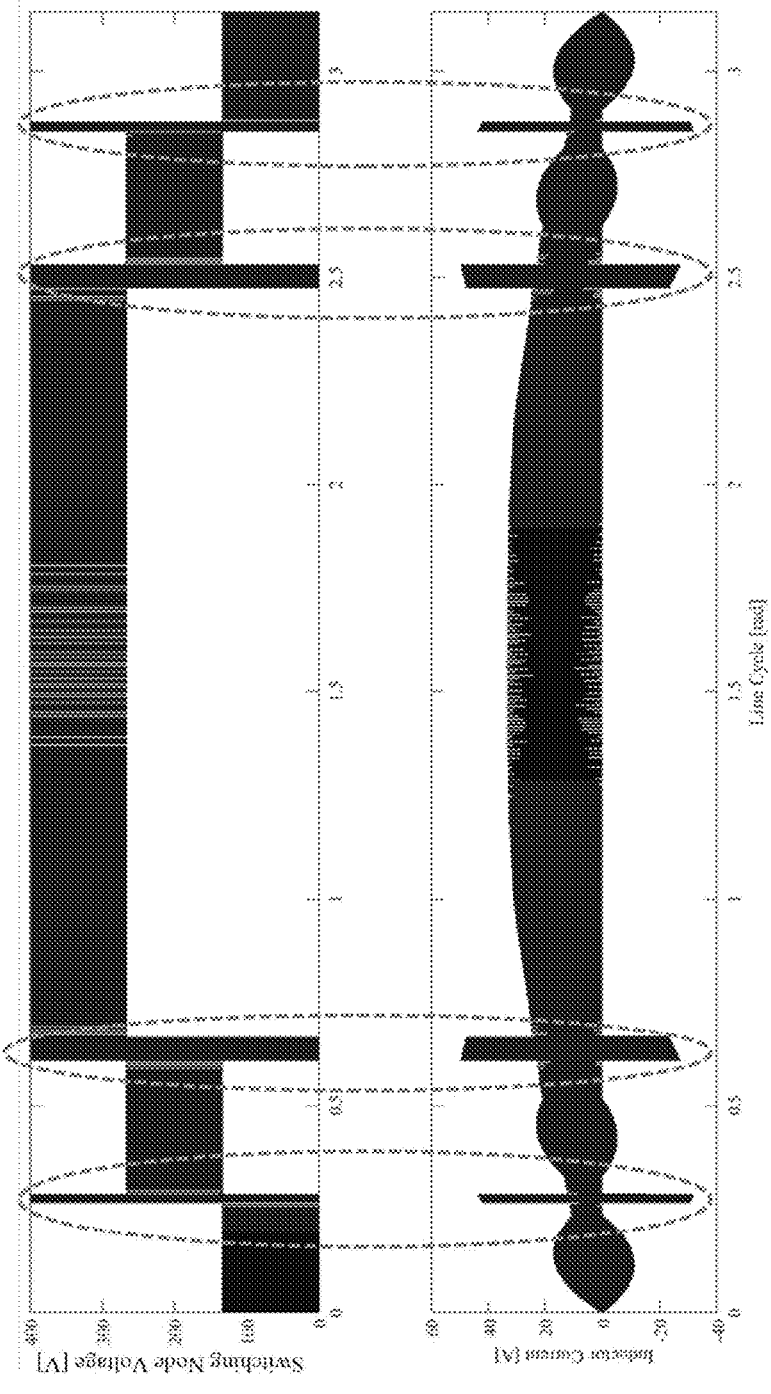
FIGS. 20A and 20B show the waveforms of the switching node voltage and the inductor current over the entire line cycle while using two variants of the first modulation scheme with redundant states during the critical transition points for the four-level FCML rectifier.
Figure 20B:
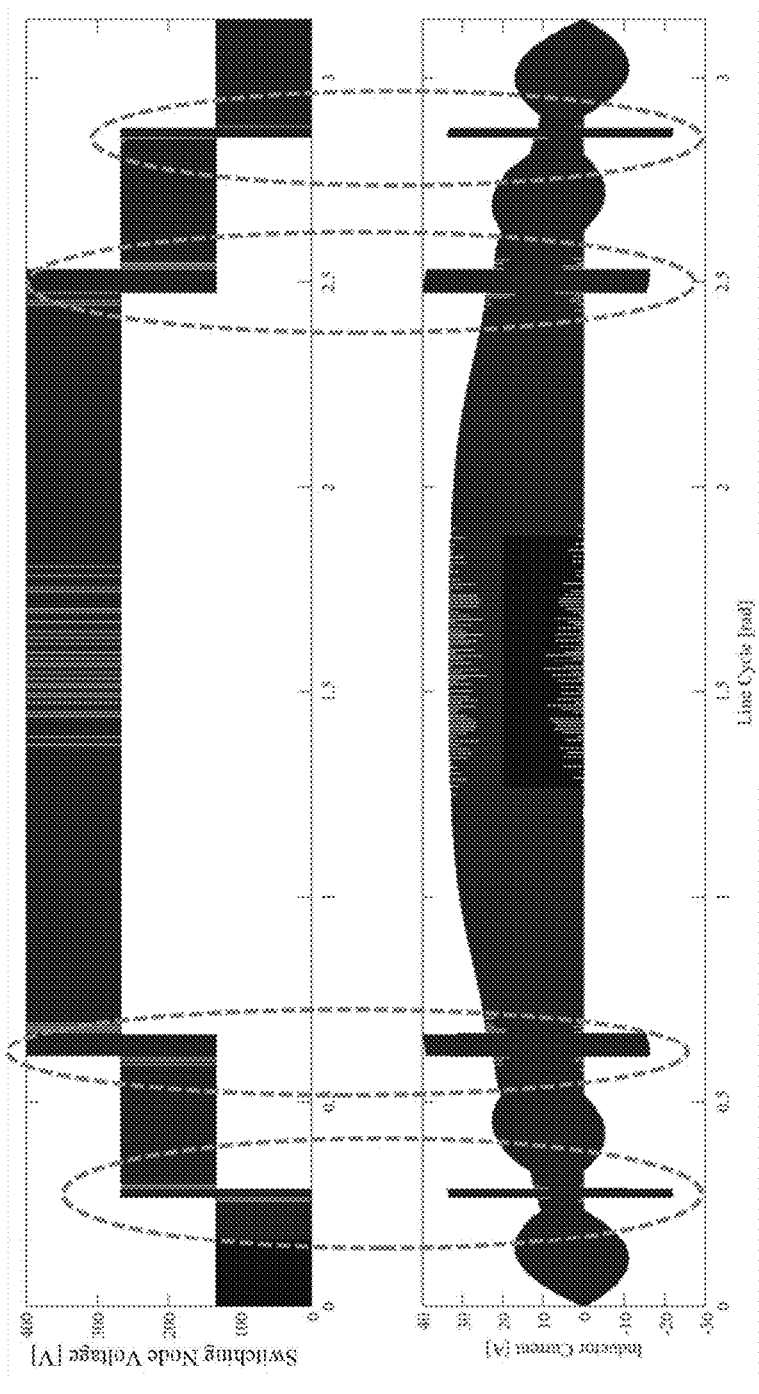
Figure 21:
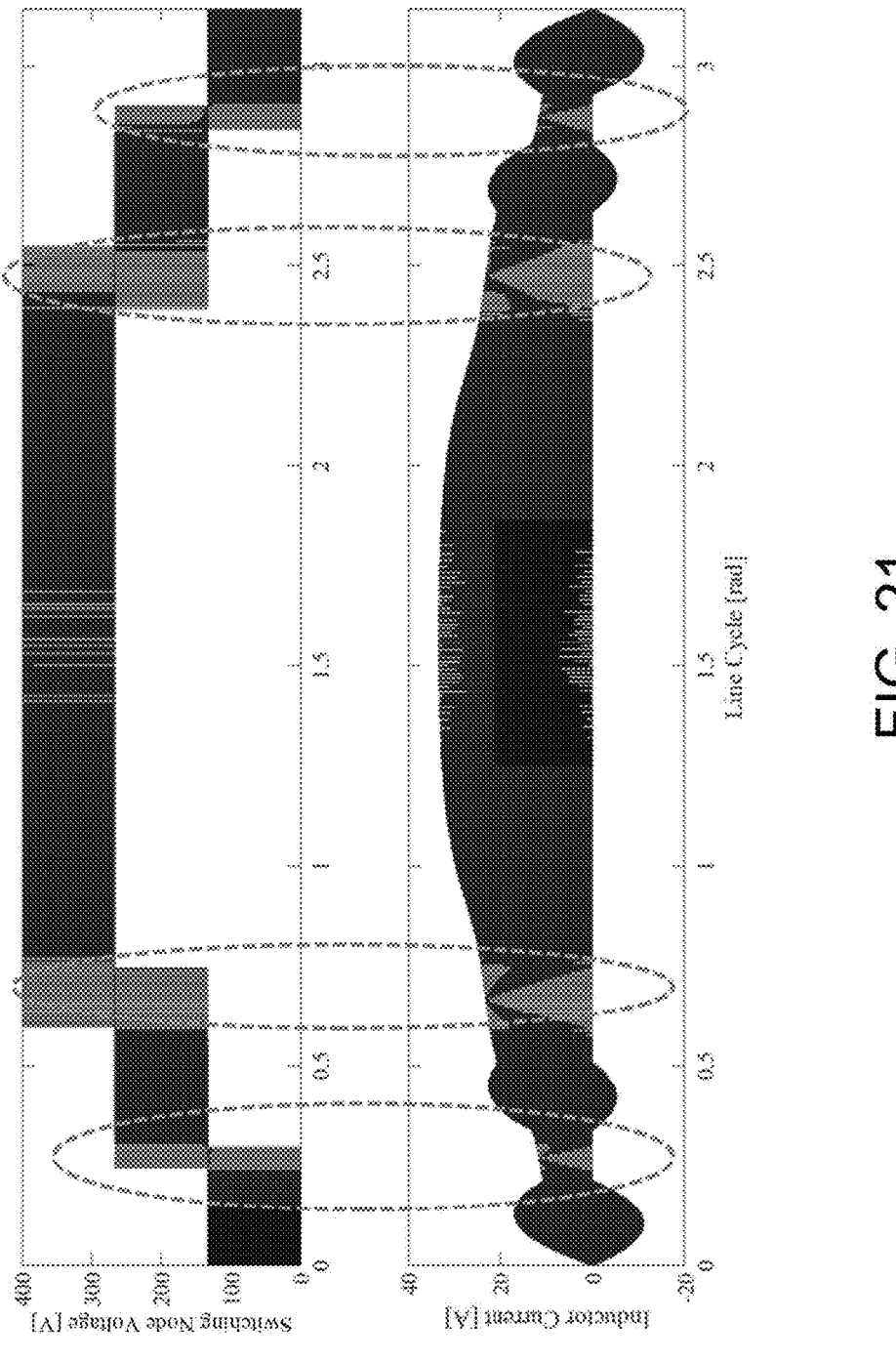
FIG. 21 shows the waveforms of the switching node voltage and the inductor current over the entire line cycle while using the second modulation scheme during the critical transition points for the four-level FCML rectifier.
Figure 22:
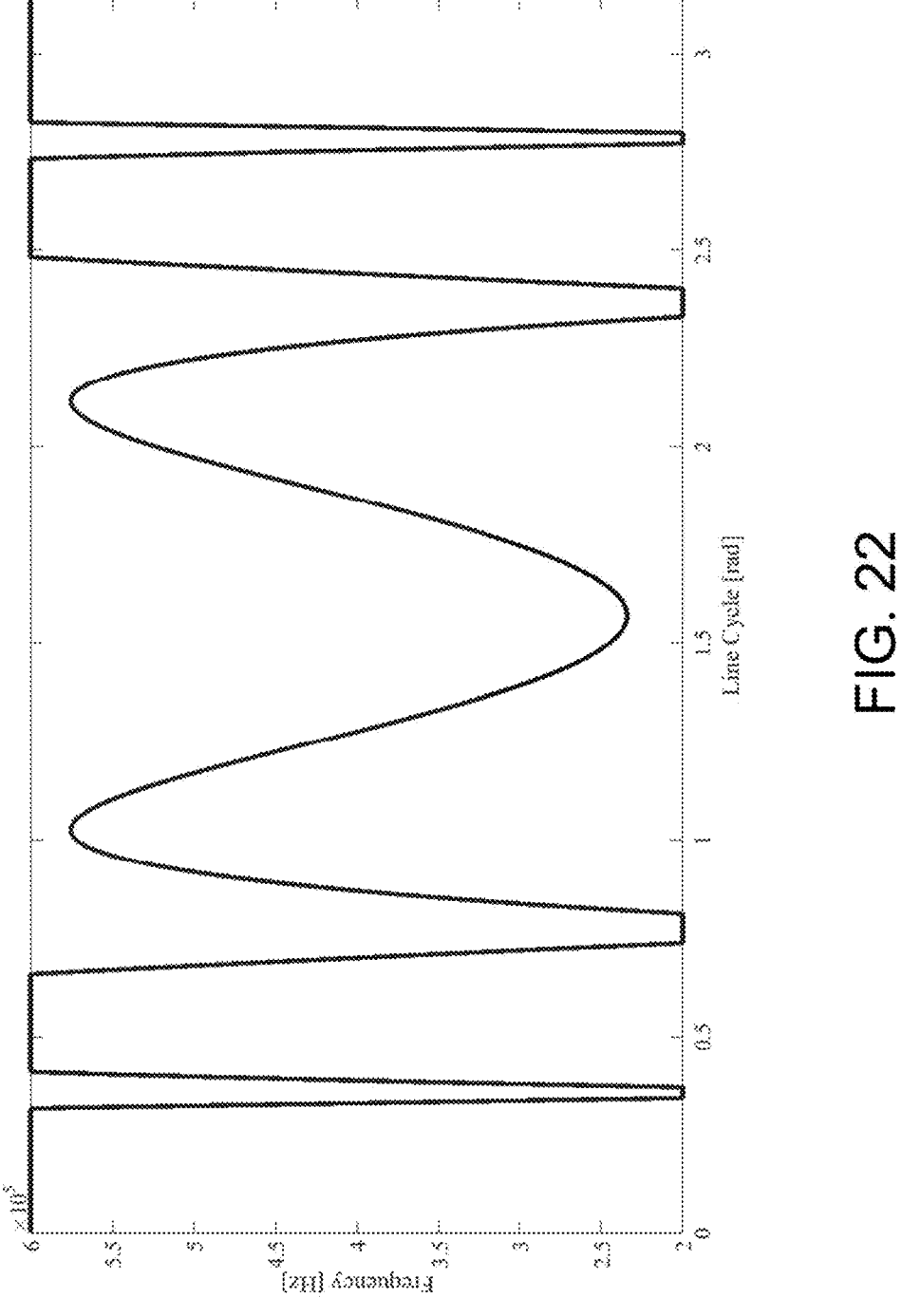
FIG. 22 exemplifies the variation in switching frequency of the four-level FCML rectifier of FIG. 9A over the line cycle in an embodiment.

The proposed modulation schemes of the present disclosure can be expanded to M-phase N-level FCML rectifier. As an example, first, FIG. 19 shows the waveforms of the switching node voltage and the inductor current over the entire line cycle while using the conventional modulation scheme during the critical transition points for the four-level FCML rectifier. It is easy to observe the existence of four critical points in the line cycle as there are two flying capacitors in this circuit as illustrated in FIG. 9A. Using the first modulation scheme of the present disclosure, ZVS of all switches can be achieved. However as there are more states available in the four-level FCML rectifier, two possible approaches exist in the first modulation scheme to achieve ZVS. FIG. 20A shows the first strategy where during the critical transition points the maximum and minimum voltages, i.e. $(0, V_{Bus})$, are applied on the switching node. This results in additional current as illustrated in FIG. 10B and FIG. 10E. With the second strategy of reduced voltage swing as documented in FIG. 10C and FIG. 10F, the current peaks can be reduced as shown in FIG. 20B. Finally, FIG. 21 shows the waveforms of the switching node voltage and the inductor current over the entire line cycle while using the second modulation scheme during the critical transition points for the four-level FCML rectifier. As described earlier for the three-level converter, here also many possible combinations of phase-shift and frequency can achieve the desired ripple current. One example frequency profile is illustrated in FIG. 22. This frequency profile in conjunction with a controlled phase shift between the gate signals of the four-level FCML rectifier depicted in FIG. 9A results in seamless ZVS with minimum circulating current throughout the entire line cycle as illustrated in FIG. 21

Figure 23:
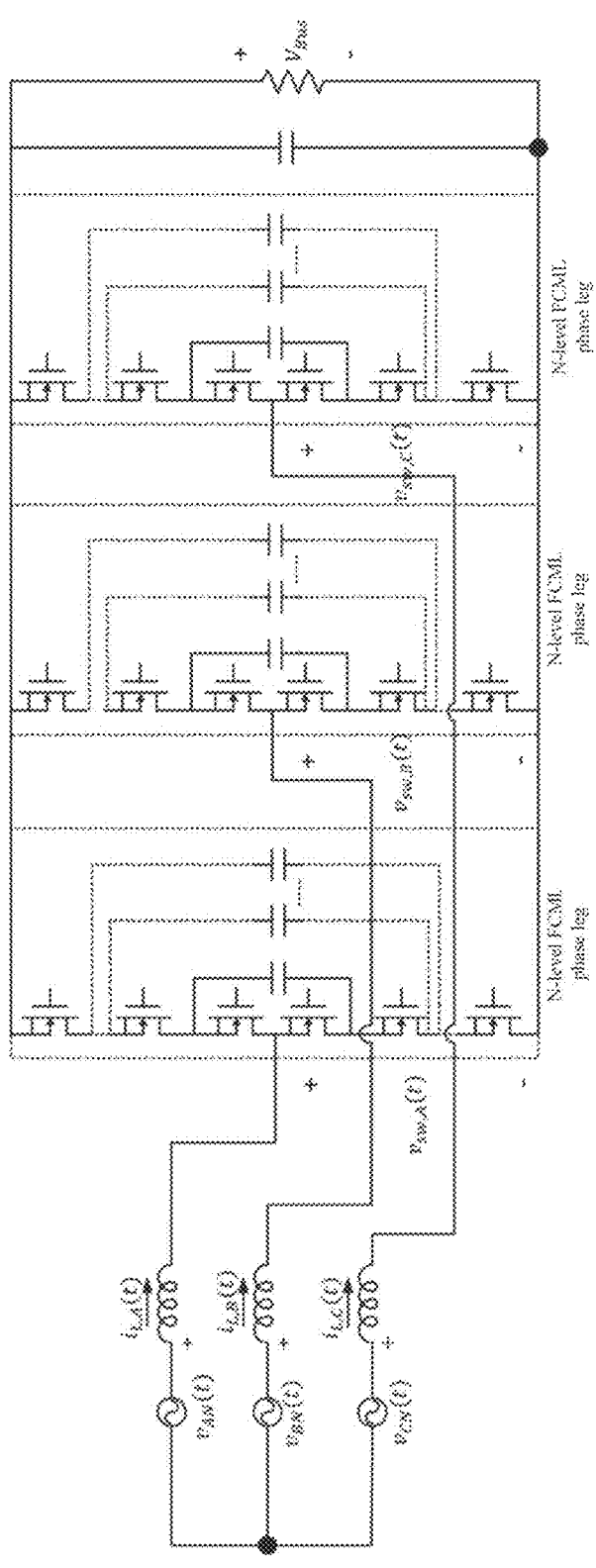
FIG. 23 schematically shows a three-phase N-level FCML rectifier according to an embodiment of the present disclosure.

For the M-phase N-level FCML rectifier, the FCML rectifier operates with M input voltages in the M phases respectively. Further, the FCML rectifier includes M switching converter stages coupled to the M input voltages, and each switching converter stage is coupled to the corresponding input voltage through the inductor L thereof. FIG. 23 schematically shows a three-phase N-level FCML rectifier according to an embodiment of the present disclosure. In the embodiment shown in FIG. 23, the FCML rectifier includes three switching converter stages coupled to the three input voltages $v_{AN}$, $v_{BN}$, and $v_{CN}$ respectively. In this case, each phase leg may be modulated like a single-phase FCML AC-DC boost converter. With the proposed modulation schemes of the present disclosure, ZVS can be maintained throughout the entire line cycle with minimum circulating currents. In FIG. 23, $i_{L.A}$, $i_{L.B}$ and $i_{L.C}$ represent the inductor currents in three phases respectively, and $v_{sw.A}$, $V_{sw.B}$ and $v_{sw.c}$ represent the switching node voltages in three phases respectively.

From the above descriptions, the present disclosure provides a FCML rectifier and a control method thereof capable of realizing ZVS of switches over the entire operating range. According to the first modulation scheme of the present disclosure, ZVS is realized by simply adjusting the phase-shift between the rising edges of the control signals of the switches. According to the second modulation scheme of the present disclosure, the phase-shift and the switching frequency of the switches are picked in conjunction to realize ZVS and reduce the additional conduction loss at the same time.

While the disclosure has been described in terms of what is presently considered to be the most practical and preferred embodiments, it is to be understood that the disclosure needs not be limited to the disclosed embodiment.

What is claimed is:

1. A flying capacitor multi-level rectifier, configured to operate with an input voltage, and comprising:

a switching converter stage, having an input terminal and first and second phase terminals, and comprising:

an inductor coupled to the input voltage and the input terminal;

N upper switches electrically connected in series between the input terminal and the first phase terminal and adapted to operate with the same duty cycle, wherein the first and $N_{th}$ upper switches are coupled to the input terminal and the first phase terminal respectively, N is an integer greater than 1;

N lower switches electrically connected in series between the input terminal and the second phase terminal and adapted to operate in complementary to the N upper switches respectively, wherein the first and $N_{th}$ lower switches are coupled to the input terminal and the second phase terminal respectively;

N−1 flying capacitors, wherein the nth flying capacitor is coupled a common node between the nth and (n+1)th upper switches and a common node between the nth and (n+1)th lower switches, where n is a positive integer less than N; and an output capacitor electrically connected between the first and second phase terminals; and a control circuit configured to provide control signals to operate the N upper switches and the N lower switches, wherein during critical transition points, the control circuit is adapted to perform at least one of first and second modulation schemes, in the first modulation scheme, the control circuit controls any rising edge of the control signal of any one of the N lower switches to be synchronous with a rising edge of the control signal of at least one another of the N lower switches for achieving ZVS of the switches, in the second modulation scheme, the control circuit controls a phase-shift between the rising edges of the control signals of the N lower switches and a switching frequency of the switches to achieve ZVS of the switches with minimum conduction loss.

2. The flying capacitor multi-level rectifier according to claim 1, wherein in the first modulation scheme, a switching node voltage, across the N lower switches, switches between zero and a bus voltage of the flying capacitor multi-level rectifier during the critical transition points.

3. The flying capacitor multi-level rectifier according to claim 1, wherein in the first modulation scheme, a switching node voltage, across the N lower switches, switches between a first voltage and a second voltage during the critical transition point around the input voltage equaling n*VBus/N, where VBus is a bus voltage of the flying capacitor multi-level rectifier, the first voltage is between 0 and n*VBus/N, and the second voltage is between n*VBus/N and VBus.

4. The flying capacitor multi-level rectifier according to claim 1, wherein in the first modulation scheme, a switching node voltage, across the N lower switches, switches between $(n-1)*V_{Bus}/N$ and $(n+1)*V_{Bus}/N$ during the critical transition point around the input voltage equaling $n*V_{Bus}/N$, where $V_{Bus}$ is a bus voltage of the flying capacitor multi-level rectifier.

5. The flying capacitor multi-level rectifier according to claim 1, wherein in the first modulation scheme, all the switches are controlled by the control circuit to maintain ampere-second or charge balance on the N−1 flying capacitors.

6. The flying capacitor multi-level rectifier according to claim 1, wherein in the second modulation scheme, the control circuit controls the phase-shift and the switching frequency to generate a current ripple in the inductor based on a bus voltage of the flying capacitor multi-level rectifier and voltages on the N−1 flying capacitors.

7. The flying capacitor multi-level rectifier according to claim 1, wherein in the second modulation scheme, the control circuit controls the phase-shift and the switching frequency according to the input voltage and a bus voltage of the flying capacitor multi-level rectifier for making a current ripple in the inductor be substantially equal to twice of an average inductor current.

8. The flying capacitor multi-level rectifier according to claim 7, wherein in the second modulation scheme, when D≤0.5 and D≥$D_\varnothing$, the control circuit controls the phase-shift and the switching frequency to generate the current ripple based on an equation:

$$\Delta i_L = \frac{V_{Bus}}{Lf_s} D(1 - D - D_\phi),$$

where D is the duty cycle, $D_\varnothing$ equals Ø/360°, Ø is the phase-shift, $\Delta i_L$ is the current ripple in the inductor, $V_{Bus}$ is the bus voltage, L is the inductor, and $f_s$ is the switching frequency, and when D≥0.5 and D≥$D_\varnothing$, the control circuit controls the phase-shift and the switching frequency to generate the current ripple based on an equation:

$$\Delta i_L = \frac{V_{Bus}}{Lf_s} (1 - D)(D - D_\phi).$$

9. The flying capacitor multi-level rectifier according to claim 7, wherein in the second modulation scheme, the control circuit generates the phase-shift by rotating leading and lagging edges between two consecutive switching cycles in order to preserve charge balance on the N−1 flying capacitors.

10. The flying capacitor multi-level rectifier according to claim 1, operating with M input voltages in M phases respectively, and comprising M switching converter stages coupled to the M input voltages respectively through the inductors thereof, where M is an integer greater than 1.

11. A control method of a flying capacitor multi-level rectifier, wherein the flying capacitor multi-level rectifier is configured to operate with an input voltage and comprises a switching converter stage, the switching converter stage comprises an input terminal, a first phase terminal, a second phase terminal, an inductor, N upper switches, N lower switches, N−1 flying capacitors, and an output capacitor, where N is an integer greater than 1, the N upper switches are electrically connected in series between the input terminal and the first phase terminal and operating with the same duty cycle, the first and Nth upper switches are coupled to the input terminal and the first phase terminal respectively, the N lower switches are electrically connected in series between the input terminal and the second phase terminal and operating in complementary to the N upper switches respectively, the first and Nth lower switches are coupled to the input terminal and the second phase terminal respectively, the nth flying capacitor is coupled between a common node between the nth and (n+1)th upper switches and a common node between the nth and (n+1)th lower switches, where n is a positive integer less than N, the output capacitor is electrically connected between the first and second phase terminals, and the control method comprises:

when performing at least one of first and second modulation schemes during critical transition points;

when performing the first modulation scheme, controlling any rising edge of a control signal of any one of the N lower switches to be synchronous with a rising edge of the control signal of at least one another of the N lower switches for achieving ZVS of the switches; and when performing the second modulation scheme, controlling a phase-shift between the rising edges of the control signals of the N lower switches and a switching frequency of the switches to achieve ZVS of the switches with minimum conduction loss.

12. The control method according to claim 11, wherein when the first modulation scheme is performed, a switching node voltage, across the N lower switches, switches between zero and a bus voltage of the flying capacitor multi-level rectifier during the critical transition points.

13. The control method according to claim 11, wherein when the first modulation scheme is performed, a switching node voltage, across the N lower switches, switches between a first voltage and a second voltage during the critical transition point around the input voltage equaling n*VBus/N, where VBus is a bus voltage of the flying capacitor multi-level rectifier, the first voltage is between 0 and n*VBus/N, and the second voltage is between n*VBus/N and VBus.

14. The control method according to claim 11, wherein when the first modulation scheme is performed, a switching node voltage, across the N lower switches, switches between $(n-1)*V_{Bus}/N$ and $(n+1)*V_{Bus}/N$ during the critical transition point around the input voltage equaling $n*V_{Bus}/N$, where $V_{Bus}$ is a bus voltage of the flying capacitor multi-level rectifier.

15. The control method according to claim 11, wherein when the first modulation scheme is performed, all the switches are controlled to maintain ampere-second or charge balance on the N−1 flying capacitors.

16. The control method according to claim 11, wherein when the second modulation scheme is performed, the phase-shift and the switching frequency are controlled to generate a current ripple in the inductor based on a bus voltage of the flying capacitor multi-level rectifier and voltages on the N−1 flying capacitors.

17. The control method according to claim 11, wherein when the second modulation scheme is performed, the phase-shift and the switching frequency are controlled according to the input voltage and a bus voltage of the flying capacitor multi-level rectifier for making a current ripple in the inductor be substantially equal to twice of an average inductor current.

18. The control method according to claim 17, wherein when the second modulation scheme is performed, if D≤0.5 and D≥$D_\varnothing$, the phase-shift and the switching frequency are controlled to generate the current ripple based on an equation:

$$\Delta i_L = \frac{V_{Bus}}{Lf_s} D(1 - D - D_\phi),$$

where D is the duty cycle, $D_\varnothing$ equals Ø/360°, Ø is the phase-shift, $\Delta i_L$ is the current ripple in the inductor, $V_{Bus}$ is the bus voltage, L is the inductor, and $f_s$ is the switching frequency, and if D≥0.5 and D≥$D_\varnothing$, the phase-shift and the switching frequency are controlled to generate the current ripple based on an equation:

$$\Delta i_L = \frac{V_{Bus}}{Lf_s} (1 - D)(D - D_\phi).$$

19. The control method according to claim 17, wherein when the second modulation scheme is performed, the phase-shift is generated by rotating leading and lagging edges between two consecutive switching cycles in order to preserve charge balance on the N−1 flying capacitors.

* * * * *